United States Patent
Ramsey

(10) Patent No.: US 9,108,683 B2
(45) Date of Patent: *Aug. 18, 2015

(54) PIVOTING MUD FLAP ASSEMBLY

(71) Applicant: HENDRICKSON USA, L.L.C., Itasca, IL (US)

(72) Inventor: John Edward Ramsey, Canton, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,765

(22) Filed: May 19, 2014

(65) Prior Publication Data

US 2014/0252754 A1 Sep. 11, 2014

Related U.S. Application Data

(63) Continuation-in-part of application No. 13/711,723, filed on Dec. 12, 2012.

(51) Int. Cl.
*B62D 25/18* (2006.01)
*B62D 25/16* (2006.01)
(52) U.S. Cl.
CPC ............ *B62D 25/166* (2013.01); *B62D 25/168* (2013.01); *B62D 25/188* (2013.01)
(58) Field of Classification Search
CPC ....................................................... B62D 25/18

USPC .................................. 280/851, 847, 848, 154
See application file for complete search history.

(56) References Cited

U.S. PATENT DOCUMENTS

| | | | | |
|---|---|---|---|---|
| 2,865,655 A | * | 12/1958 | Boysen | 280/851 |
| 3,737,176 A | * | 6/1973 | Cobb | 280/851 |
| 4,007,944 A | * | 2/1977 | Dingess | 280/851 |
| 4,319,764 A | * | 3/1982 | Whitaker | 280/154 |
| 4,352,502 A | * | 10/1982 | Leonard et al. | 280/851 |
| 4,413,839 A | * | 11/1983 | McCain | 362/485 |
| 5,148,886 A | * | 9/1992 | Parsons | 180/275 |
| 6,443,492 B1 | * | 9/2002 | Barr et al. | 280/851 |
| 6,827,372 B2 | * | 12/2004 | Barr et al. | 280/847 |
| 7,014,211 B2 | * | 3/2006 | Ogles et al. | 280/847 |
| 7,226,086 B2 | * | 6/2007 | Haynes | 280/851 |
| 7,475,911 B2 | * | 1/2009 | Edwards | 280/851 |
| 7,708,315 B1 | * | 5/2010 | Dumitrascu | 280/848 |

* cited by examiner

*Primary Examiner* — Hau Phan
(74) *Attorney, Agent, or Firm* — Dureska, Kennedy & Moore, L.L.C.; David P. Dureska; Brent L. Moore

(57) ABSTRACT

A mud flap assembly for a vehicle includes a mud flap and a mud flap bracket. The mud flap is attached to the mud flap bracket. The mud flap bracket is in turn attached to the vehicle by an attachment means so that when the mud flap is pinched between a tire of the vehicle and a fixed object resting on the ground, the mud flap bracket and the mud flap are moved and/or deflected substantially uniformly downwardly toward the ground in order to prevent damage to the mud flap, the mud flap bracket and the vehicle.

14 Claims, 29 Drawing Sheets

PIVOTING MUD FLAP ASSEMBLY

CROSS-REFERENCE TO RELATED APPLICATION

This application is a continuation-in-part of application Ser. No. 13/711,723, filed on Dec. 12, 2012, which claims the benefit of U.S. Provisional Patent Application Ser. No. 61/569,811, filed Dec. 13, 2011.

BACKGROUND OF THE INVENTION

1. Field of the Invention

The invention relates generally to heavy-duty wheeled vehicles. More particularly, the invention is directed to frames and subframes for semi-trailers. Even more specifically, the invention is directed to a mud flap mounting assembly that is pivotally attached to the frame of a semi-trailer. The mud flap assembly is lightweight, easy to assemble, and prevents damage to the mud flap, the mud flap angle bracket and the mud flap bracket. The mud flap assembly also prevents damage to cross members or other structural components to which the mud flap assembly is connected when the mud flap is pinched between a tire and a fixed curb during operation of the heavy-duty vehicle. The mud flap assembly is relatively easy to assemble during installation of the subframe onto the heavy-duty vehicle.

2. Background Art

Heavy-duty wheeled vehicles, such as tractor-trailers or semi-trailers, typically include one or more suspension assemblies that connect the wheel-bearing axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. Subframes have been utilized on tractor-trailers for many years. The subframe is a box-like structure that is mounted on the underside of the trailer body of the tractor-trailer and one or more axle/suspension systems are suspended from the subframe structure. For those heavy-duty vehicles that support a subframe, the subframe can be non-movable or movable, the latter being commonly referred to as a slider box, slider subframe, slider undercarriage, or secondary slider frame. A trailer having a slider box gains an advantage with respect to laws governing maximum axle loads. Proper placement of the slider box varies individual axle loads or redistributes the trailer loads so that it is within legal limits. Once properly positioned, the slider box is locked in place on the underside of the trailer by a retractable pin mechanism. For the purpose of convenience and clarity, reference herein will be made to slider boxes, with the understanding that such reference is by way of example, and that the present invention applies to heavy-duty vehicles having main members, such as primary frames, movable subframes and non-movable subframes, and also applies to heavy-duty vehicles that do not have main members or subframes.

The axle/suspension system is typically suspended from the main members of the slider box by a pair of aligned and spaced-apart depending hangers. More specifically, each suspension assembly of an axle/suspension system includes a longitudinally extending elongated beam. Each beam typically is located adjacent to and below a respective one of a pair of spaced-apart longitudinally extending main members and one or more cross members, which form the slider box of the vehicle. Each beam is pivotally connected at one of its ends to a hanger, which in turn is attached to and depends from a respective one of the main members of the slider box of the vehicle. An axle extends transversely between and typically is connected by some means to the beams of the pair of suspension assemblies at a selected location from about the midpoint of each beam to the end of the beam opposite from its pivotal connection end. The opposite end of each beam also is connected to a bellows air spring or its equivalent, which in turn is connected to a respective one of the main members.

Typically, in a slider box configuration, mud guards or mud flaps are suspended from a mud flap mounting bracket that spans the width of the slider box and that is attached to the main members of the slider box at a fixed distance rearward of the tires. A mud flap angle bracket is in turn mounted on the mud flap bracket and spans the entire width of the semi-trailer. The mud flaps are mounted on the mud flap angle bracket via heavy bolts disposed through aligned openings formed in the mud flaps and the mud flap angle bracket. Each mud guard or mud flap is spaced sufficiently behind the tires to minimize the likelihood of the mud flap rubbing the tires or getting caught in the tires, yet close enough to the tires to deflect the greatest amount of dirt, debris and/or water cast off of the tires during operation of the vehicle.

These prior art mud flap mounting brackets and angle brackets are prone to deformation and/or potential failure when the mud flap is pinched between the tires of the vehicle and a curb or other fixed object, such as when the vehicle is backing up into a loading dock or a parking space that includes a curb or other fixed object such as a railroad tie. More particularly, in this situation, the mud flap is pinched between the tires and the curb or other fixed object and the mud flap is pulled downwardly resulting in deformation of the mud flap mounting bracket and/or the mud flap angle bracket, and additionally may cause tearing of the mud flap away from the mounting bolts attaching the mud flap to the mud flap angle bracket. As a result, the mud flap mounting bracket and the mud flap angle bracket, as well as the mounting bolts, must be sufficiently robust to minimize or reduce deformation when the mud flap is pinched between the tires and a curb or other fixed object. This increases the weight of the slider box and in turn reduces the amount of cargo that can be carried by the vehicle.

Other types of mud flap mounting brackets also exist and are most commonly seen on heavy-duty trucks. These mud flap mounting brackets typically attach to the truck frame and project outboardly from the truck frame. A mud flap is secured to the bracket behind the tires of the truck. These types of mud flap mounting brackets typically include a spring within the outboardly projecting bracket that is attached at one end to the bracket and at the other end to the truck frame. This configuration allows the bracket to pivot at the bracket-to-truck frame interface, thereby allowing the outboard end of the bracket to pivot downwardly or in other directions, but the bracket-to-truck frame interface remains at the original height. This configuration eliminates problems associated with deformation of the bracket but does not resolve the problem of the mud flap tearing from the mounting bolts, potentially causing damage to the mud flap.

Therefore, a need exists in the art for a mud flap mounting assembly that is relatively lightweight, provides for easy assembly of the mud flap mounting assembly and which overcomes the problems of the prior art mud flap mounting brackets set forth above. The mud flap mounting assembly of the present invention overcomes the problems associated with prior art mud flap mounting brackets by providing a mud flap mounting assembly for a slider box of a semi-trailer that is relatively lightweight, easy to assemble and that provides generally parallel deflection or downward rotation of the mud flap and the mud flap mounting bracket with respect to the ground thereby eliminating deformation and damage to the mud flap bracket and also eliminating tearing away of the mud flap from the mounting bracket when the mud flap is pinched between the tires and a curb or other fixed object.

SUMMARY OF THE INVENTION

Objectives of the present invention include providing a mud flap assembly that is relatively lightweight.

A further objective of the present invention is to provide a mud flap assembly that is easy to assemble.

Yet another objective of the present invention is to provide a mud flap assembly that prevents the brackets of the mud flap assembly, the mud flap and the vehicle from being damaged when the mud flap is pinched between the tire of the vehicle and a fixed object such as a curb.

These objectives and advantages are obtained by the mud flap assembly for a vehicle including a mud flap; a mud flap bracket attached to the mud flap; and means for attaching the mud flap bracket to the vehicle so that when the mud flap is pinched between a tire of the vehicle and a fixed object, the mud flap bracket and the mud flap are moved substantially uniformly downwardly toward the fixed object.

BRIEF DESCRIPTION OF THE SEVERAL VIEWS OF THE DRAWINGS

The preferred embodiments of the present invention, illustrative of the best mode in which applicant has contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENTS

Figure 1:
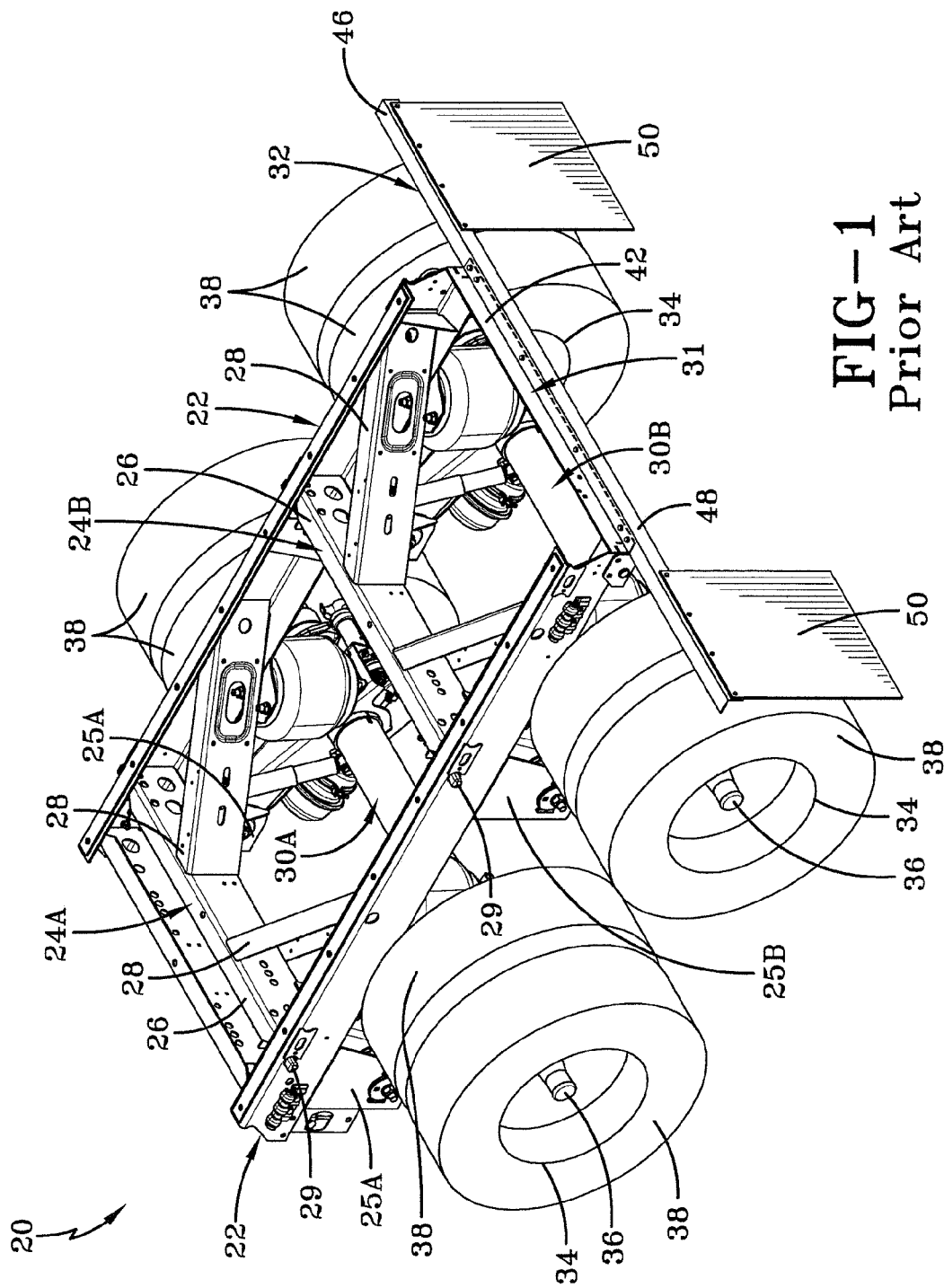
FIG. 1 is a driver-side rear perspective view of a slider box of a heavy-duty semi-trailer, incorporating a prior art mud flap mounting bracket, and showing a pair of mud flaps mounted on respective ends of a mud flap angle bracket, which is in turn mounted on the mud flap mounting bracket extending between the main members of the slider.

In order to better understand the structure, assembly and operation of the first and second preferred embodiment mud flap assemblies for a slider box of a semi-trailer of the present invention, the structure and operation of a prior art mud flap assembly for a slider box 20 now will be described and is shown in FIG. 1, and is indicated by reference numeral 32. Slider box 20 includes a pair of elongated, longitudinally extending, spaced-apart parallel main members 22. Main members 22 are connected to each other by a pair of K-shaped cross members 24A and 24B. K-shaped cross members 24A,B extend between and typically each nest in and are welded to main members 22 to form the interconnected rigid structure of slider box 20. Front and rear pairs of hangers 25A and 25B, respectively, of slider box 20 suspend front and rear axle/suspension systems 30A,B, respectively, from main members 22.

Figure 2:
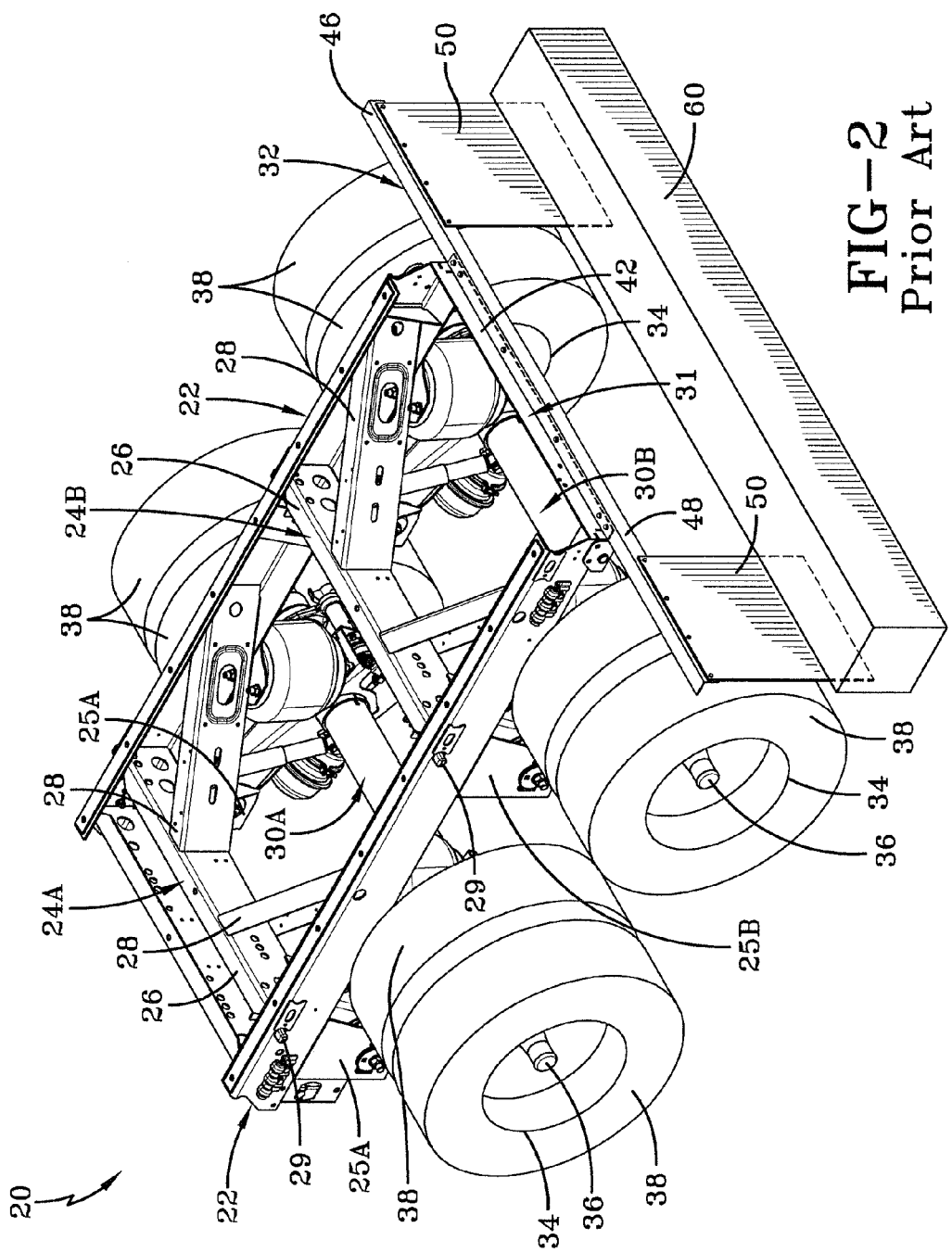
FIG. 2 is a view similar to FIG. 1, but showing a curb located behind the wheels and mud flaps of the slider.

More specifically, each main member 22 is a generally C-shaped cross-sectional beam typically made of steel. The open portion of each main member 22 is opposed to the open portion of the other main member and faces inboard in relation to slider box 20. Each K-shaped cross member 24A,B also is formed of steel and includes a base member 26 which extends between and is perpendicular to main members 22, and two inclined or angled cross brace members 28, each of which extend in a generally diagonal manner between a generally central portion of the base member and a respective one of the main members 22, as shown in FIGS. 1 and 2. Each end of base member 26, and the outboard end of each cross brace member 28, nests in the open portion of a respective one of main members 22, and are secured therein by any suitable means such as welding. A pair of steel reinforcement boxes (not shown) are mounted on main members 22 adjacent to and above rear hangers 25B to provide additional strength to slider box 20 for supporting the hangers and rear axle/suspension system 30B pivotally attached thereto. A mud flap bracket 31 is mounted on and extends between the rear ends of main members 22 to provide additional strength to the overall structure of slider box 20, and also to provide a means for mounting the mud flaps to the slider box. A retractable pin mechanism 29 used for selectively locking slider box 20 in place on a primary frame (not shown) of a vehicle also is shown, but does not form part of the slider box. Pairs of wheels 34 are rotatably mounted on each axle spindle end 36 of front and rear axle suspension systems 30A,B. A tire 38 is mounted on each wheel 34 in a manner well known to those skilled in the art.

Figure 3:
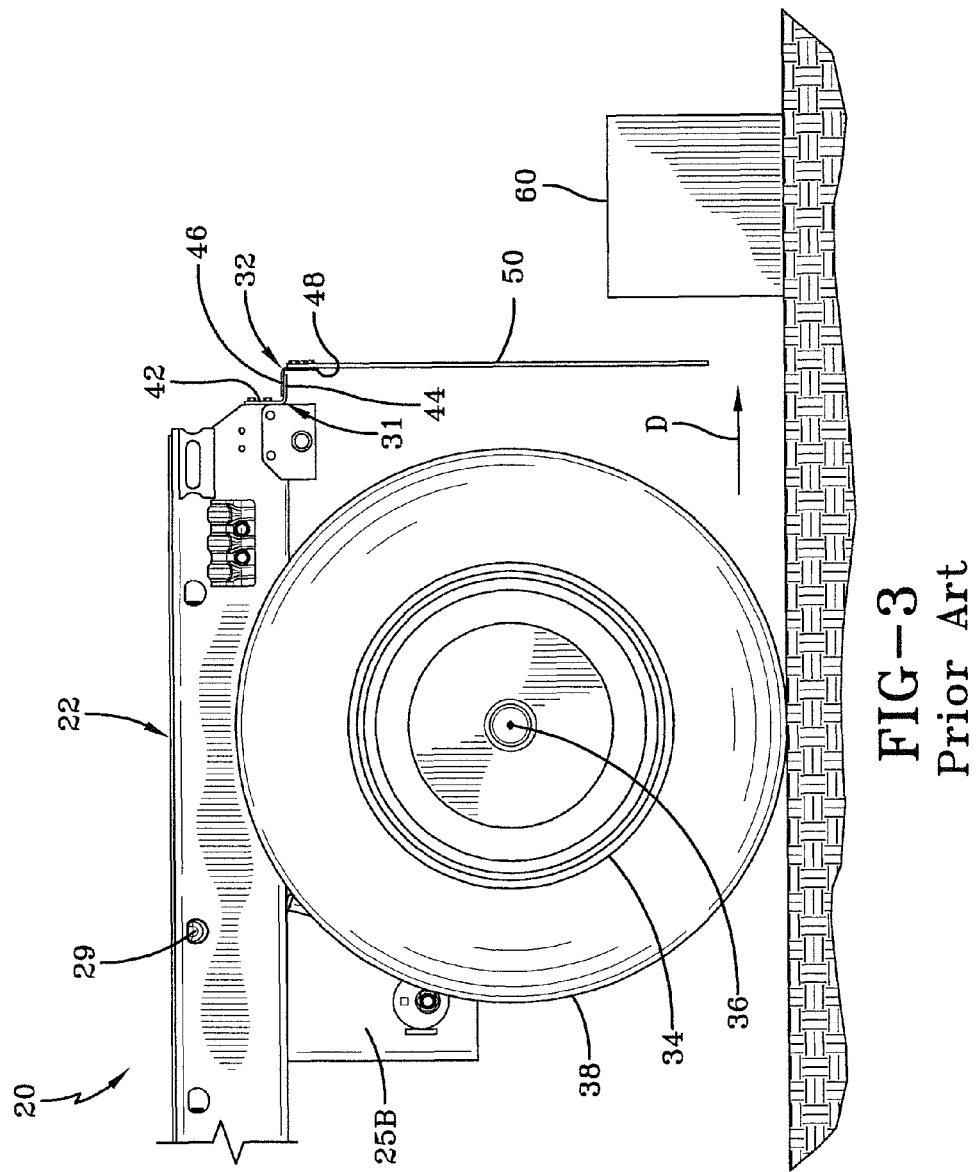
FIG. 3 is a fragmentary side view of the driver-side rear wheel and mud flap of the slider box shown in FIG. 2, and showing the curb located behind the rear wheel and mud flap of the slider.
Figure 8:
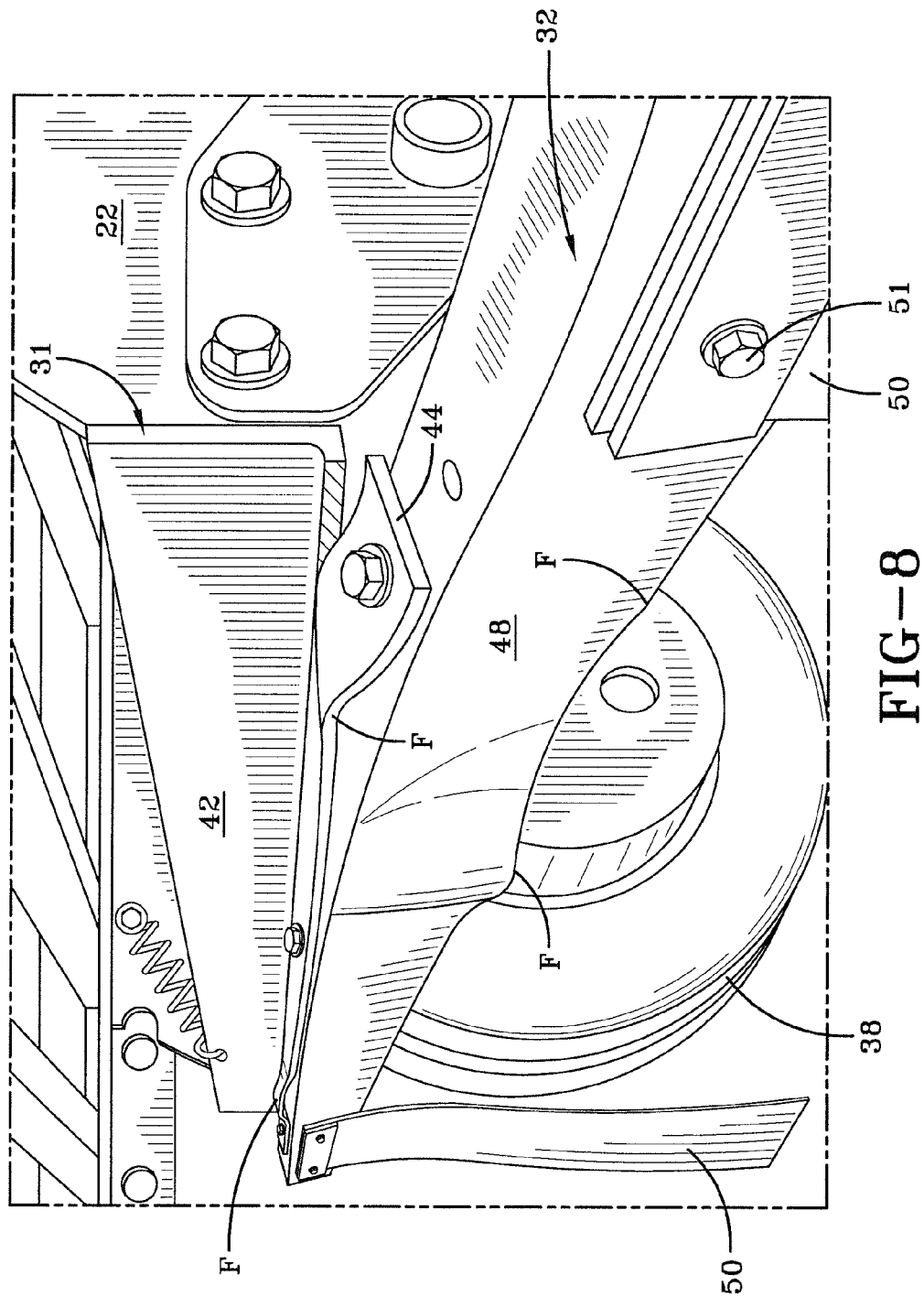
FIG. 8 is a fragmentary curb-side rear perspective view similar to FIG. 7, showing deformation of the mud flap mounting bracket and the mud flap angle bracket as a result of pinching of the mud flap between the tires and the curb.

Referring now to FIG. 3, mud flap bracket 31 has a generally L-shaped cross-section that includes an upper vertical member 42 and a lower horizontal member 44. Vertical member 42 is attached to the rear end of main members 22 in manner well known to those having skill in the art, such as by welds (not shown). Mud flap bracket horizontal member 44 is formed with a plurality of spaced-apart openings (not shown). A mud flap angle bracket 32, also having a generally inverted L-shaped cross-sectional shape, includes an upper horizontal plate 46 and a lower vertical plate 48. Horizontal plate 46 of mud flap angle bracket 32 is formed with a plurality of spaced-apart openings (not shown) that align with the spaced-apart openings formed in mud flap bracket horizontal member 44, for receiving fasteners (not shown) to mount mud flap angle bracket 32 to mud flap bracket 31. Mud flap angle bracket vertical plate 48 also is formed with a plurality of spaced-apart openings (not shown) that align with spaced-apart openings (not shown) formed in a pair of mud flaps 50. A fastener 51 (FIG. 8) is disposed through each pair of aligned openings to mount the mud flaps to the mud flap angle bracket.

Figure 4:
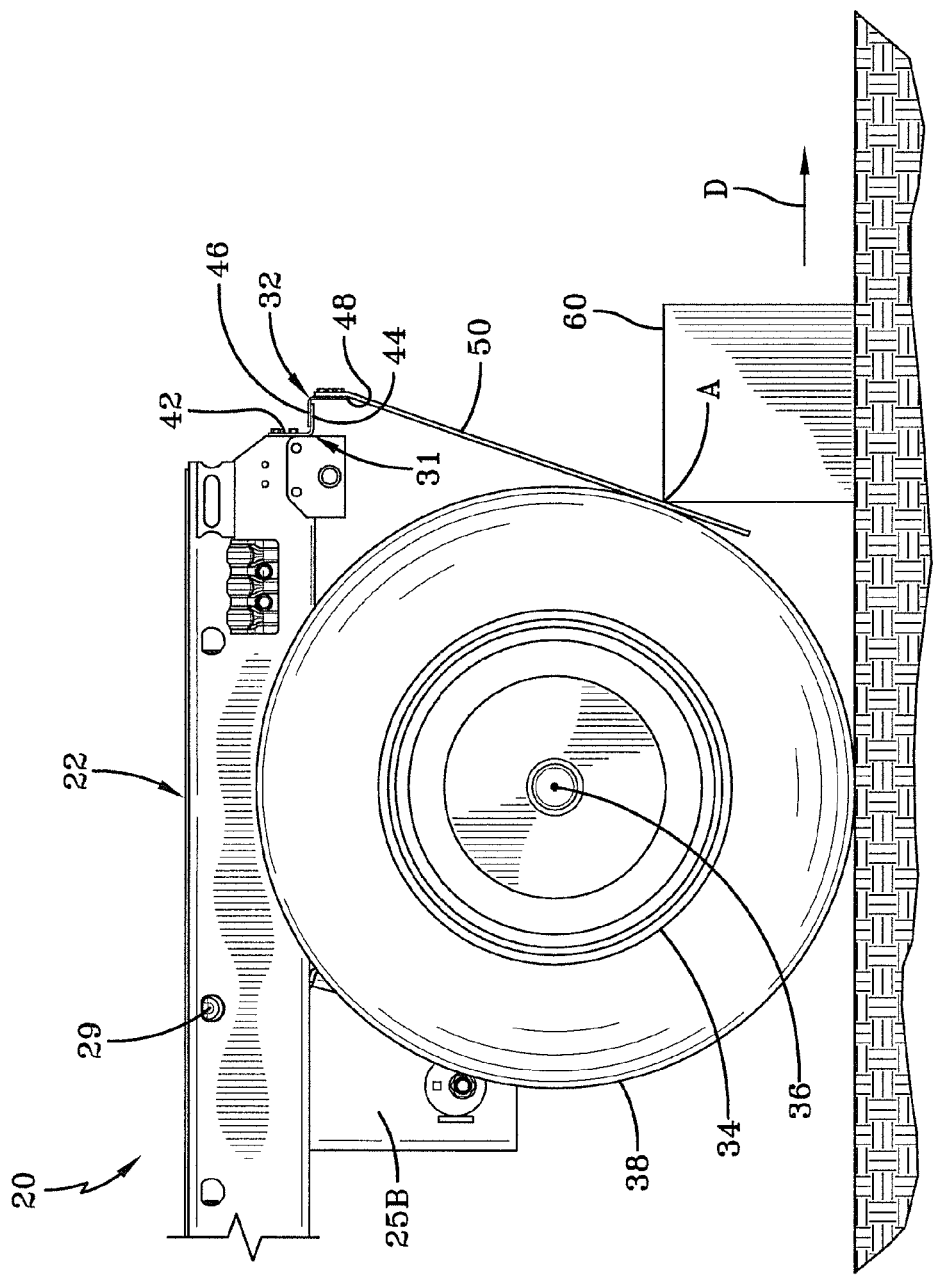
FIG. 4 is a view similar to FIG. 3, but showing the mud flap contacting the curb and approaching the rear tire of the slider when the semi-trailer backs up adjacent to the curb.
Figure 5:
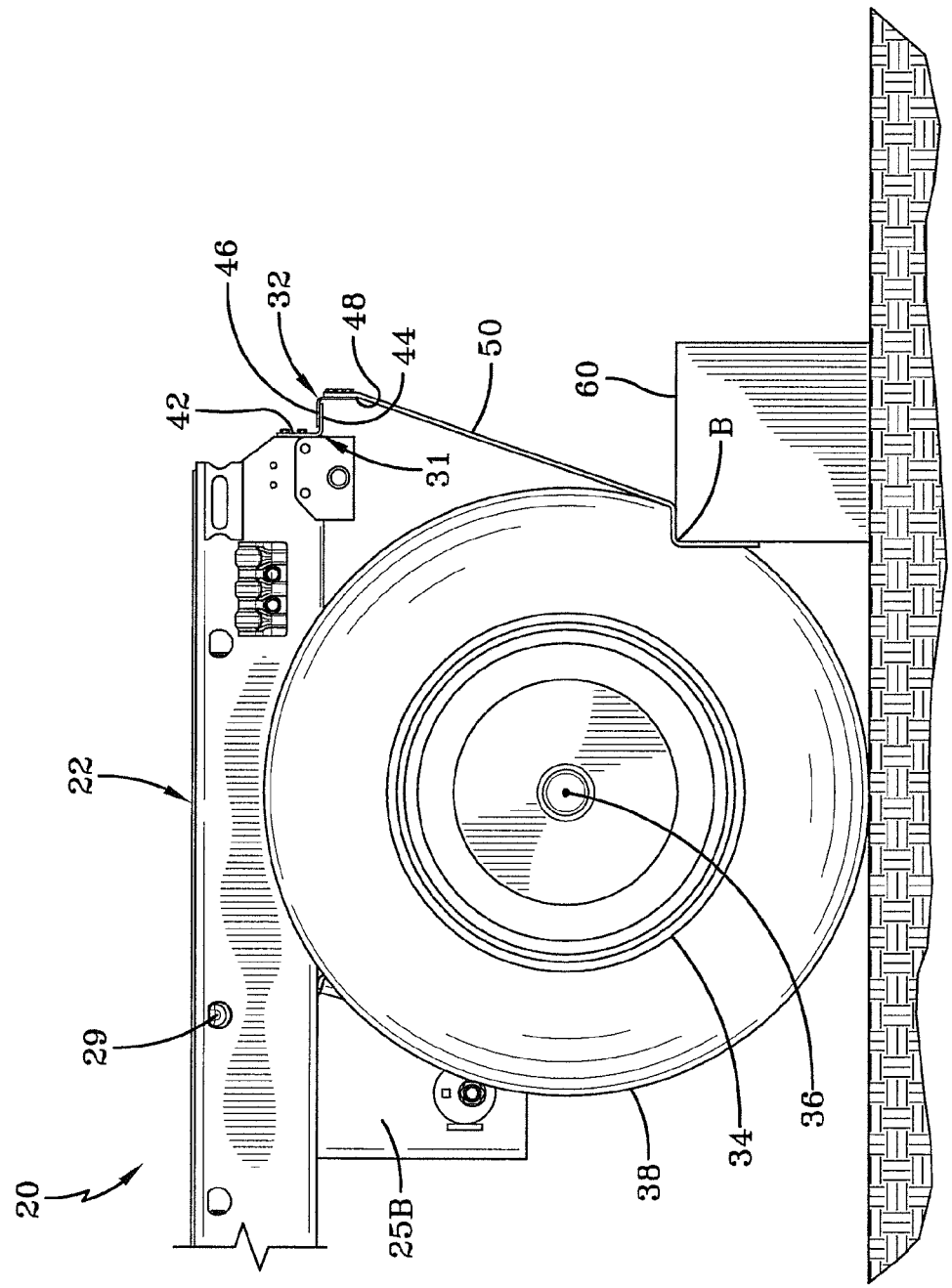
FIG. 5 is a view similar to FIG. 3, but showing the mud flap pinched between the curb and the rear tire of the slider when the rear tire contacts the curb.
Figure 6:
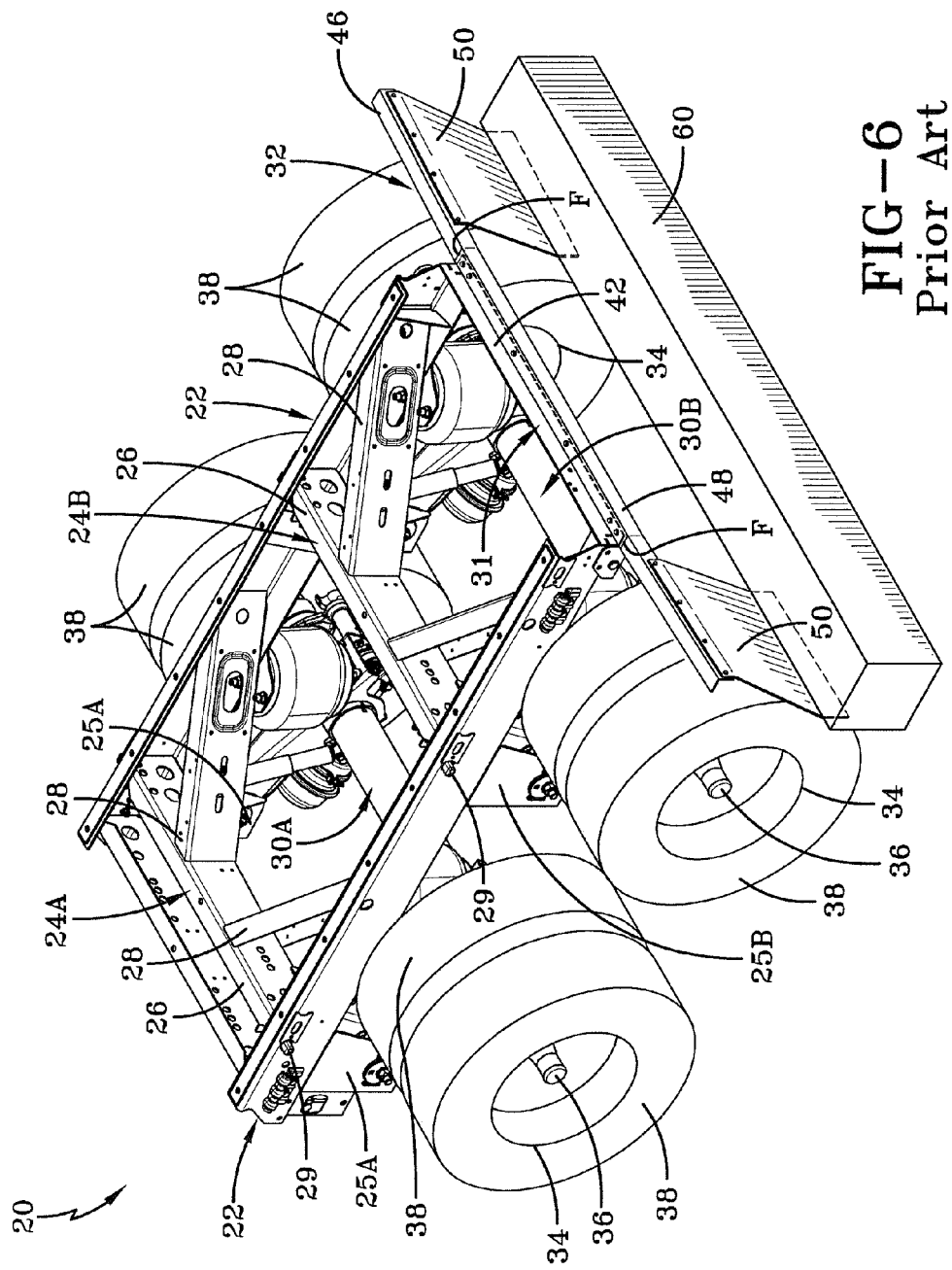
FIG. 6 is a view similar to FIG. 2, but showing the mud flap pinched between the curb and the rear tire of the slider.
Figure 7:
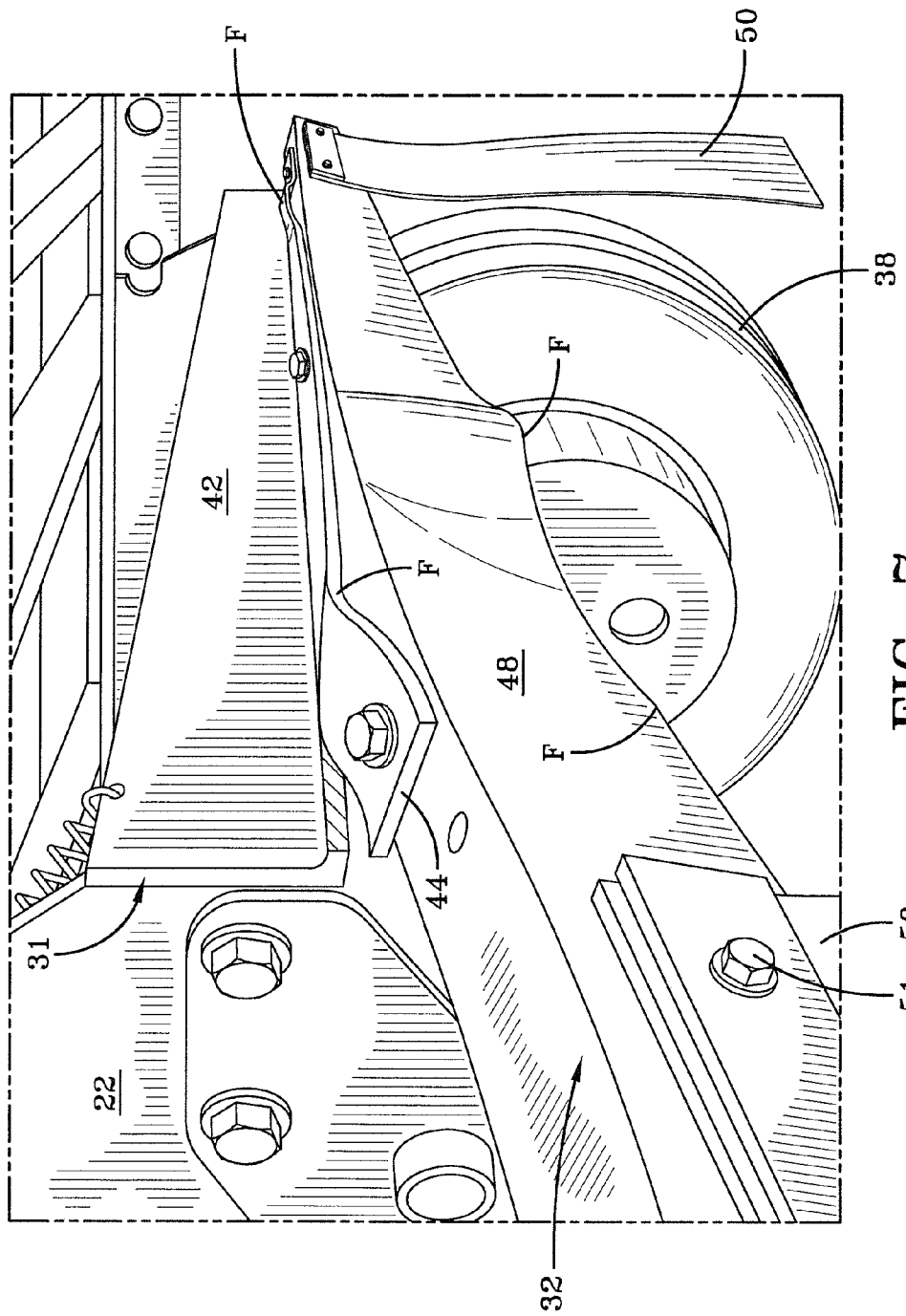
FIG. 7 is a fragmentary driver-side rear perspective view of a prior art mud flap mounted on the mud flap angle bracket which is in turn mounted on the mud flap mounting bracket of a slider box, showing deformation of the mud flap mounting bracket and the mud flap angle bracket as a result of pinching of the mud flap between the tires and the curb.

FIGS. 3-8 now will be used to illustrate the adverse effect on mud flap angle bracket 32 and mud flap bracket 31 when mud flap 50 encounters a fixed object such as curb 60. With particular reference to FIG. 3, prior art mud flap bracket 31 is shown in its normal operating position as it nears fixed curb 60 moving in direction D with the semi-trailer as the vehicle backs up toward the curb. Turning now to FIG. 4, as the vehicle moves further in direction D toward curb 60, mud flap 50 contacts the curb at point A and is moved toward tire 38. Turning now to FIG. 5, as the vehicle moves further in direction D toward curb 60, mud flap 50 becomes pinched between tire 38 and the curb at point B. As a result of being pinched, mud flap 50 is pulled downwardly toward curb 60 which can deform mud flap angle bracket 32 and mud flap bracket 31 out of its generally parallel-to-the-ground orientation as shown at F in FIGS. 6-8.

Figure 9:
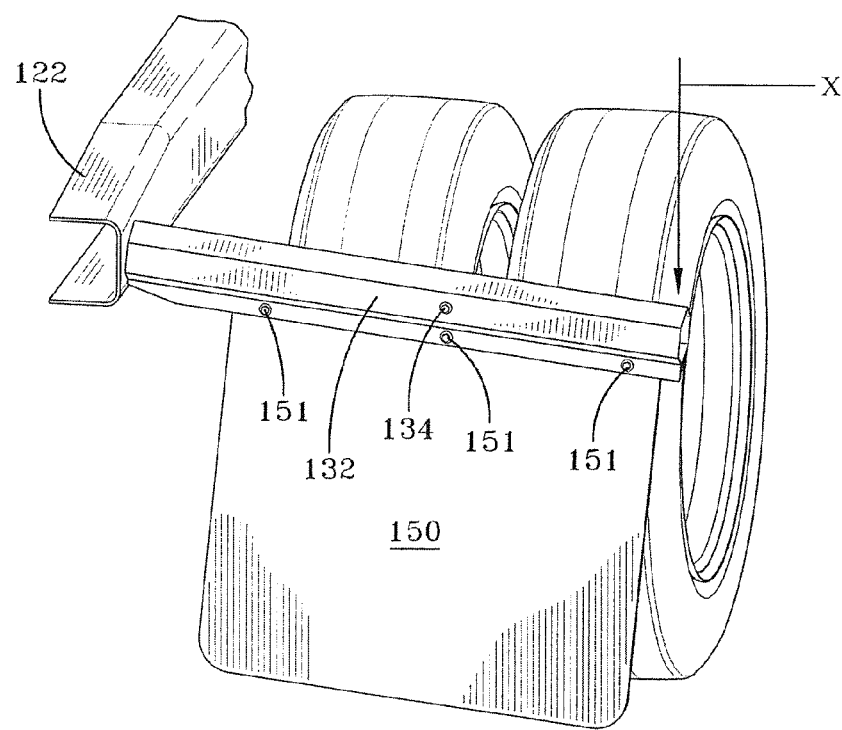
FIG. 9 is a fragmentary rear perspective view of another prior art mud flap mounting bracket for a heavy-duty truck, showing the outboard end of the mud flap bracket being pivoted downwardly behind the rearmost tires of the truck.
Figure 10:
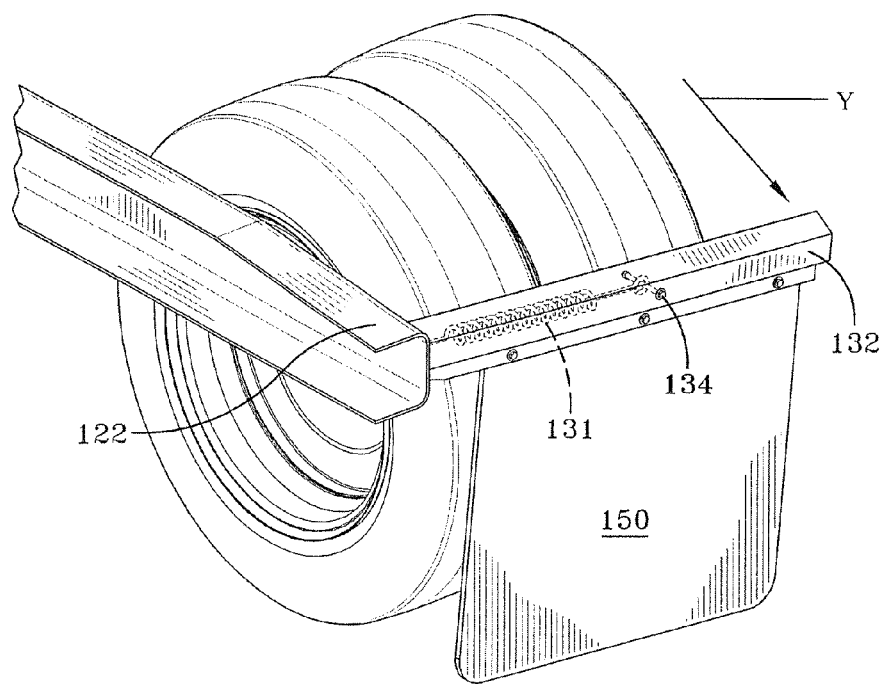
FIG. 10 is a view similar to FIG. 9, showing the spring and the mud flap bracket being pivoted rearwardly away from the rearmost tires of the truck.
Figure 11:
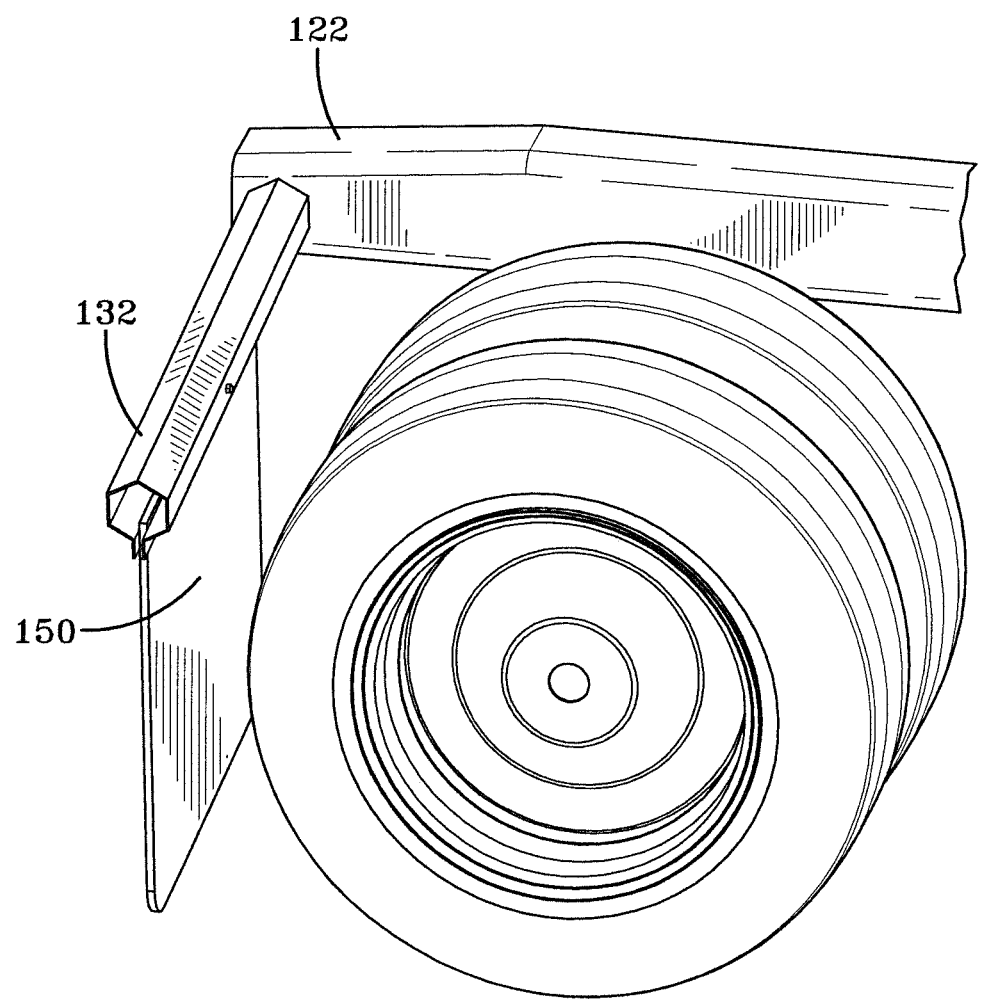
FIG. 11 is a curb-side view of the mud flap bracket shown in FIG. 9.

Turning now to FIGS. 9-11, another prior art mud flap bracket is shown generally at reference numeral 132 mounted on a truck frame 122 and will be described in detail below. Mud flap bracket 132 has a generally hexagonal tubular cross-section and extends outboardly from truck frame 122. A mud flap 150 is mounted on mud flap bracket 132 by fasteners 151 in a manner well known to those having skill in the art. A spring 131 disposed within mud flap bracket 132 attaches at its outboard end to a pin 134 and at its inboard end to truck frame 122. Spring 131 is biased in the direction of the truck frame 122 and holds mud flap bracket 132 against the truck frame, yet still allows the mud flap bracket to pivot vertically up and down, and horizontally fore and aft, at the mud flap bracket-to-truck frame interface as shown at X and Y in FIGS. 9 and 10, respectively. It should be noted that the inboard end of mud flap bracket 132 at the mud flap bracket-to-truck frame interface does not move appreciably in any given direction but only pivots to allow the outboard end of the mud flap to move in a given direction. As a result, movement at the outboard end of mud flap bracket 132 is greater than movement at the inboard end of the mud flap bracket. When mud flap 150 is pinched between the rear-most tire and a fixed curb, pivoting movement at the inboard end of mud flap bracket 132 is insufficient to prohibit tearing of the mud flap from the mud flap bracket. Therefore, prior art mud flap bracket 132 fails to eliminate tearing of mud flap 150 when the mud flap is pinched between a fixed curb and the rearmost tire of the heavy-duty vehicle.

Therefore, a need exists in the art for a mud flap mounting assembly that is relatively lightweight, provides for easy assembly of the mud flap mounting assembly, and which overcomes the problems of prior art mud flap mounting brackets 32 and 132 set forth above. The mud flap assembly of the present invention overcomes the problems associated with prior art mud flap brackets, and will now be described in detail below.

Figure 12:
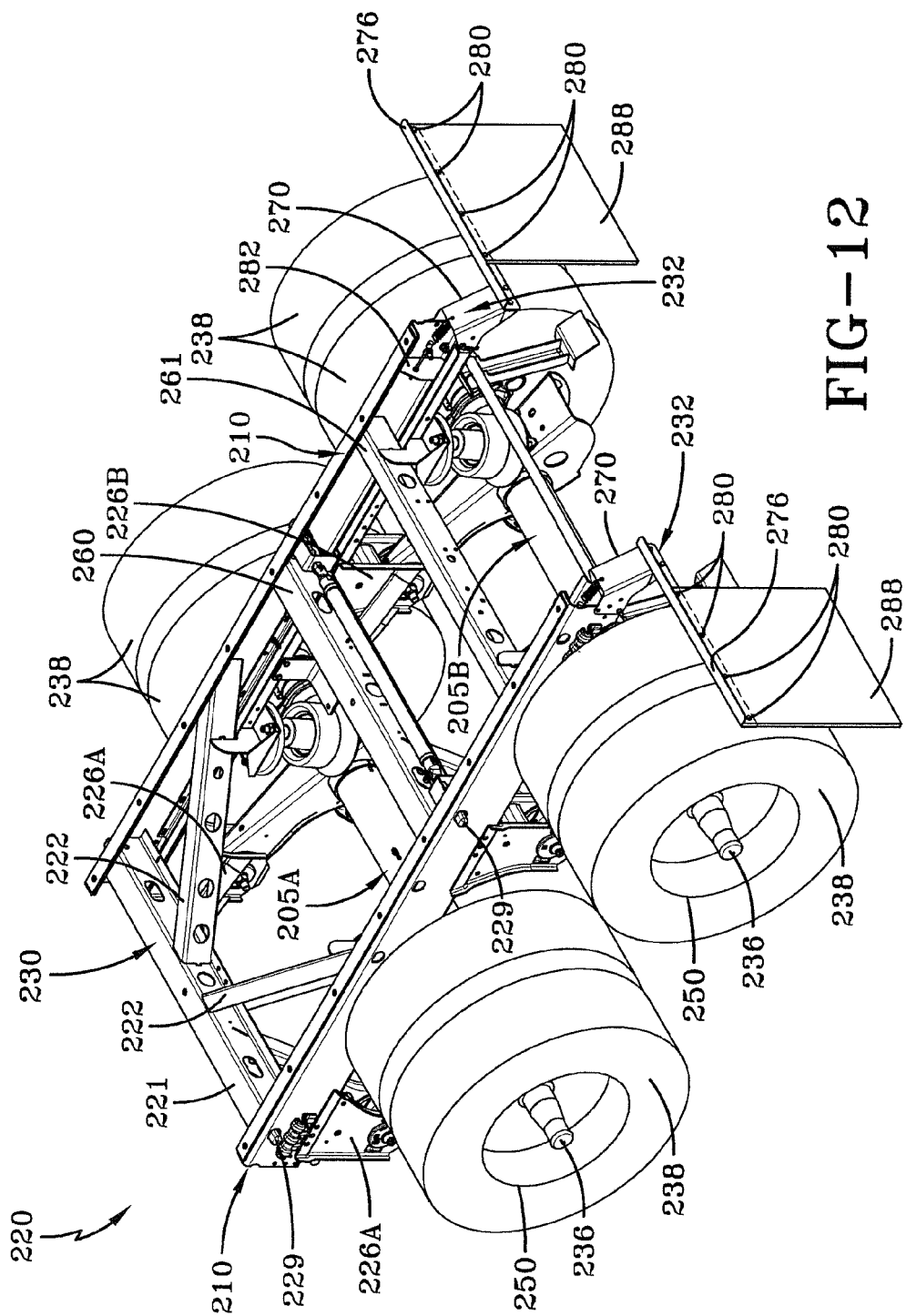
FIG. 12 is a perspective view of a slider box for a semi-trailer incorporating a pair of first preferred embodiment mud flap assemblies of the present invention.

A first preferred embodiment mud flap assembly of the present invention is shown in FIG. 12, at reference numeral 232, mounted on a slider box 220 for a semi-trailer and will be described in detail below. Slider box 220 includes a pair of main members 210, a front generally K-shaped cross member 230, a rear cross member 260, a rear cross brace 261 and front and rear pairs of hangers 226A and 226B, respectively. Cross member 230 includes a base member 221 and a pair of angled cross brace members 222. Base member 221 is connected at each one of its ends to a respective one of main members 210. Each one of cross brace members 222 is connected at its inboard end to the central portion of the rear surface of base member 221 and at its outboard end to a respective one of inboard surfaces of main members 210. Main members 210 each have a generally G-shaped transverse cross-section. Front and rear pairs of hangers 226A and 226B, respectively, depend from the lowermost surface of respective ones of main members 210. Hangers 226A,B are longitudinally spaced from one another and pivotally mount front and rear axle/suspension systems 205A, 205B. A retractable pin mechanism 229 used for selectively locking slider box 220 in place beneath a primary frame (not shown) of a vehicle also is shown, but does not form part of the slider box. Wheels 250 are rotatably mounted on axle spindles 236 of axle/suspension systems 205A,B in a manner well known to those skilled in the art. Tires 238 are mounted on each of wheels 250 in a manner well known to those having skill in the art.

Figure 13:
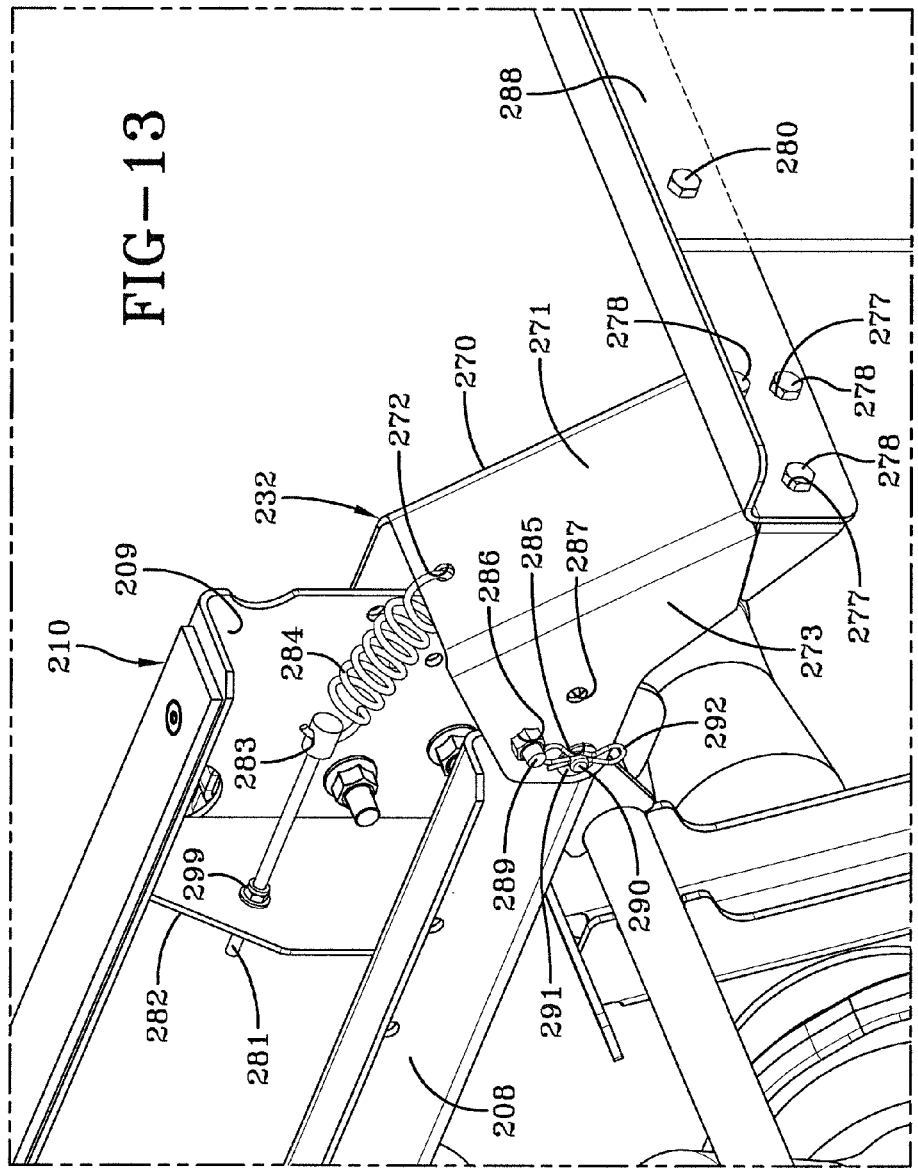
FIG. 13 is an enlarged fragmentary rear perspective view of the curbside first preferred embodiment mud flap assembly of the present invention, showing the mud flap bracket pivotally attached to the curbside main member of the slider box and fixedly attached to the curbside mud flap angle bracket, and also showing the spring attached to the upper portion of the mud flap bracket and the gusset of the curbside main member.
Figure 19:
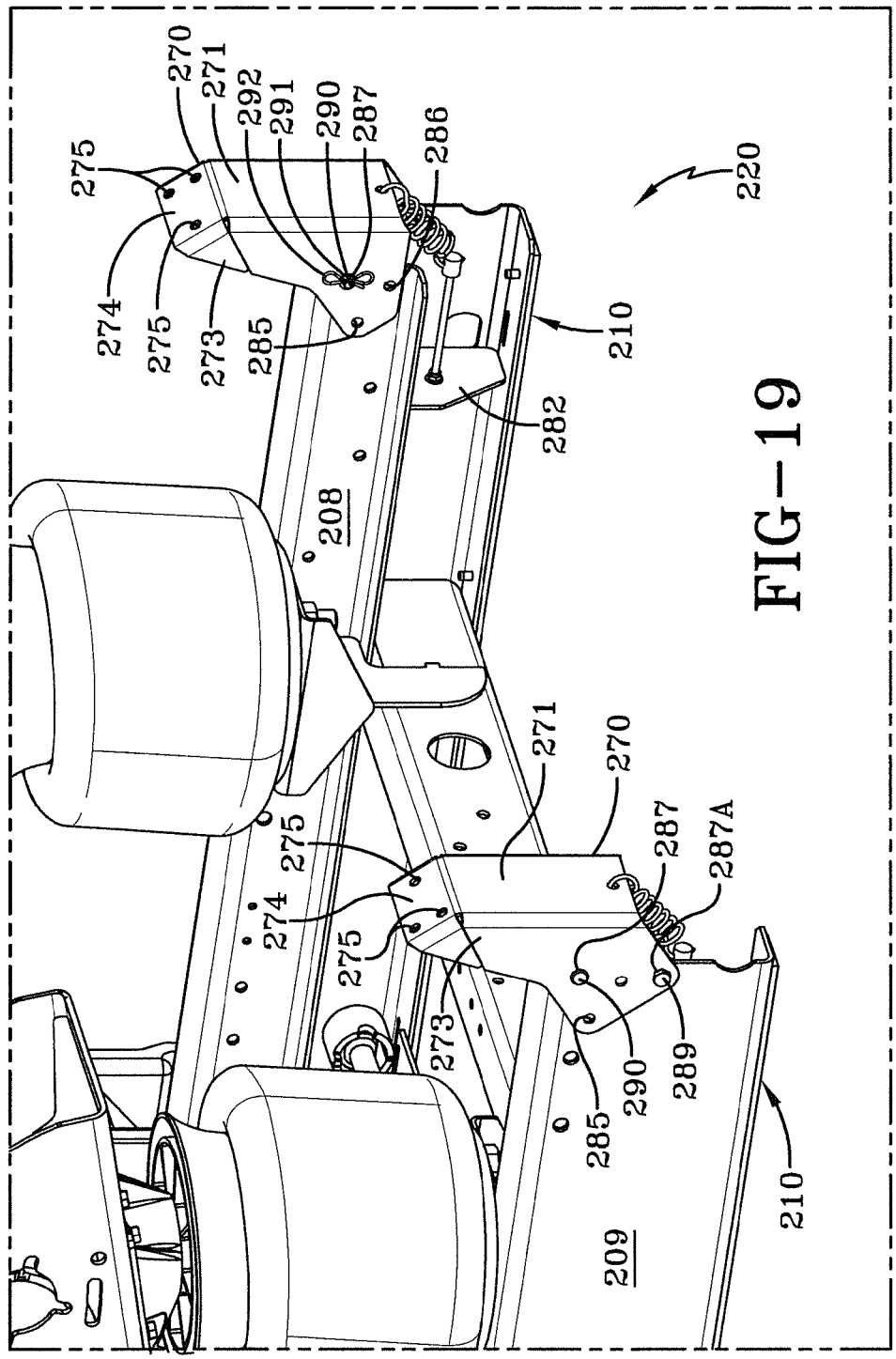
FIG. 19 is an enlarged fragmentary view similar to FIG. 18, showing the mud flap brackets in the shipping position.

Referring now to FIGS. 12 and 13, in accordance with one of the primary features of the present invention, mud flap assembly 232 includes a mud flap bracket 270 formed from a rigid material such as steel and having a generally U-shaped cross-section. More specifically, mud flap bracket 270 preferably is integrally formed as one piece and includes a generally flat top plate 271 formed with an opening 272 adjacent its front edge. A pair of side walls 273 extend downwardly from top plate 271. An angled rear plate 274 (FIG. 19) extends generally downwardly from the rear edge of top plate 271 and connects to side walls 273. Angled rear plate 274 is formed with a plurality of openings 275. An angle bracket 276 having a generally inverted L-shaped cross-section is formed with a plurality of openings 277 adjacent the inboard end of the angle bracket, which align with angled rear plate openings 275 (FIG. 19). Each one of a plurality of fasteners 278, is disposed through respective ones of aligned openings 275, 277 to rigidly attach angle bracket 276 to mud flap bracket 270. Angle bracket 276 is further formed with a plurality of spaced apart openings (not shown) formed along the length of the angled bracket. These openings (not shown) align with openings (not shown) formed in mud flap 288 and a fastener 280 is disposed through each of the aligned openings in order to rigidly attach the mud flap to angle bracket 276. A tensioning bolt 281 is disposed through a nut (not shown) and an opening (not shown) formed in a gusset 282 of main member 210 of slider box 220. The nut (not shown) is located on the front side of gusset 282. A jam nut 299 is threaded onto tensioning bolt 281 on the rear side of gusset 282 in order to lock the tensioning bolt into place. Tensioning bolt 281 is adjustable and its rear end is formed with an opening 283. A coil spring 284 is disposed through tensioning bolt rear opening 283 and also through opening 272 formed in mud flap bracket top plate 271. A pivot opening 285 is formed in and extends through inboard and outboard bracket sidewalls 273 adjacent to the front lowermost edge of the sidewall. A stop opening 286 is formed near the front edge of inboard sidewall 273 approximately midway between pivot opening 285 and top plate 271 (FIG. 13). A stop consisting of a fastener 289 is disposed through stop opening 286. Fastener 289 extends outwardly from inboard sidewall 273 and contacts the sidewall of main member 210 to prevent upward pivoting of mud flap bracket 270. A pair of shipping openings 287 (FIGS. 19 and 20) are formed in and extend through sidewalls 273, and their operation in connection with mud flap assembly 232 will be described in more detail below. A dowel pin 290 formed with an opening (not shown) near its inboard end is disposed through pivot openings 285 in inboard and outboard mud flap bracket sidewalls 273 and also through aligned openings (not shown) formed in main member 210 inboard and outboard sidewalls 208 and 209, respectively. A washer 291 is disposed on the end of dowel pin 290 adjacent inboard sidewall 273 and an anti-vibration bowtie retaining clip 292 is disposed through the dowel pin opening (not shown), so that the dowel pin is retained in pivot openings 285 and the aligned openings formed in the inboard and outboard side walls of main member 210. Having now described the structure of mud flap assembly 232 of the present invention, the operation of the mud flap assembly is shown in FIGS. 14-17 and will be described in detail below.

Figure 14:
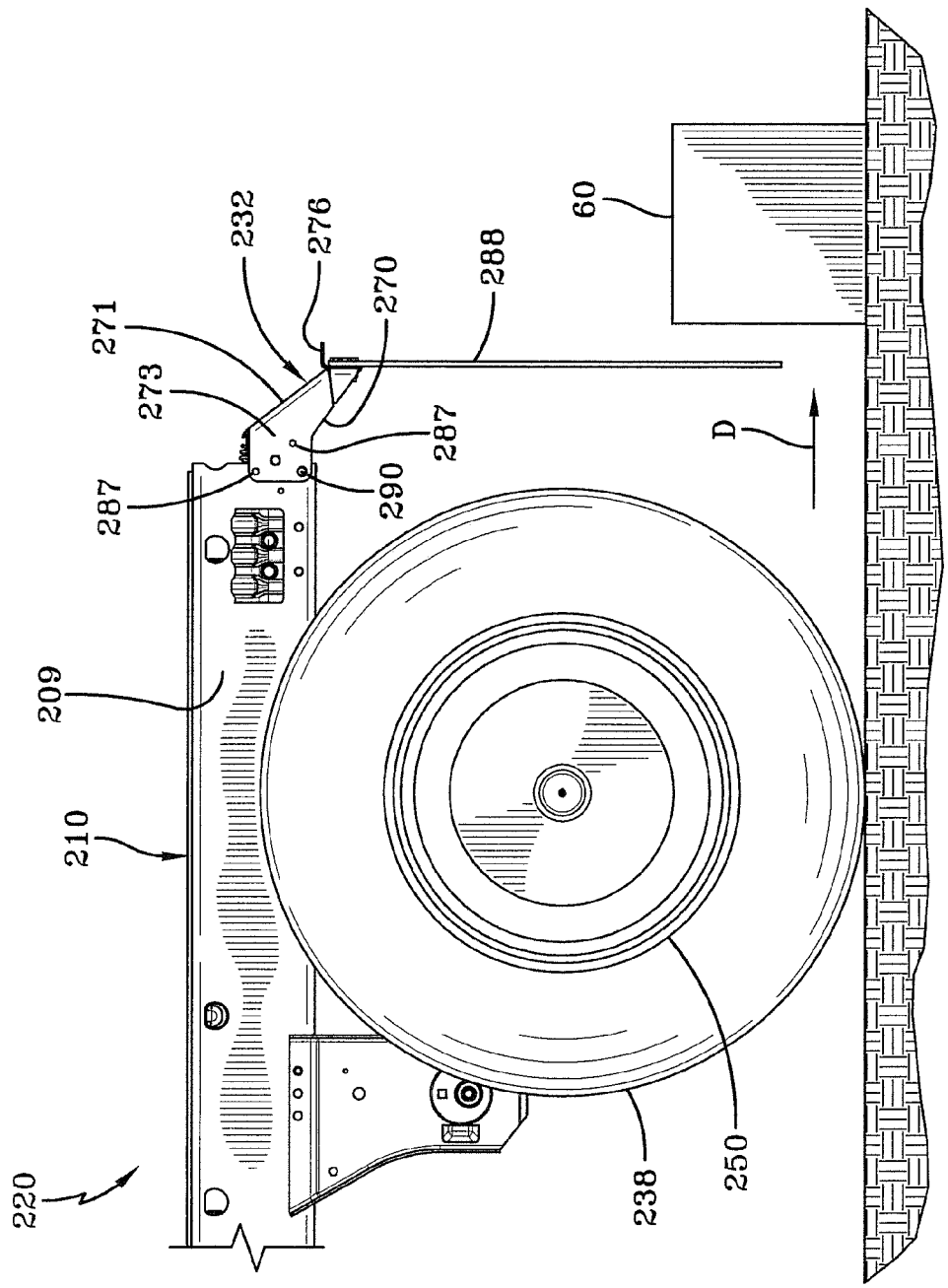
FIG. 14 is a fragmentary side view of the driver-side rear tire and driver-side first preferred embodiment mud flap assembly of the present invention shown in FIG. 12, showing the mud flap in its normal operating state and positioned between the rear driver-side tire of the slider box and a curb.
Figure 15:
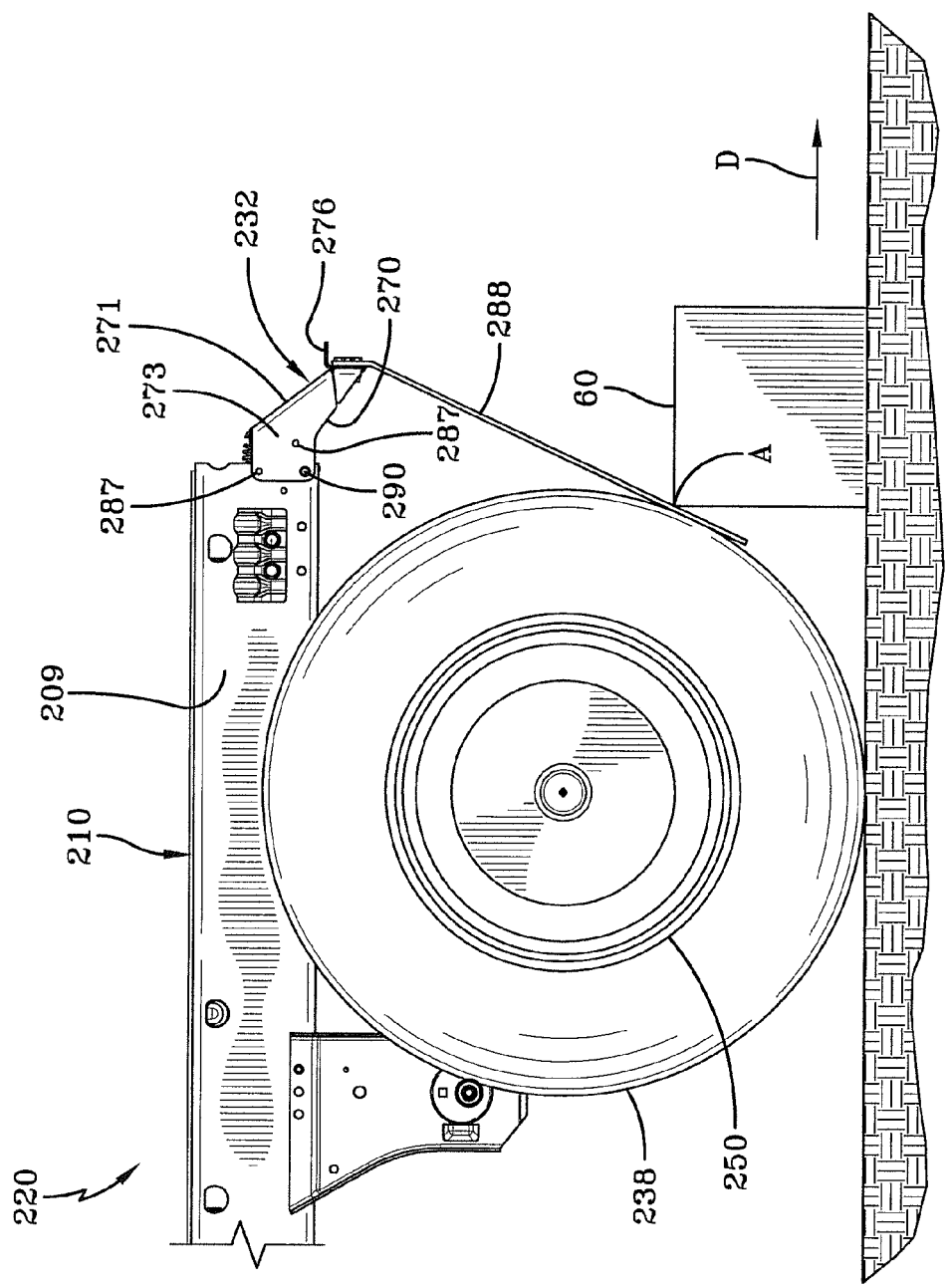
FIG. 15 is a view similar to FIG. 14, but showing the mud flap contacting the curb and approaching the rear tire of the slider when the semi-trailer backs up adjacent to the curb.
Figure 16:
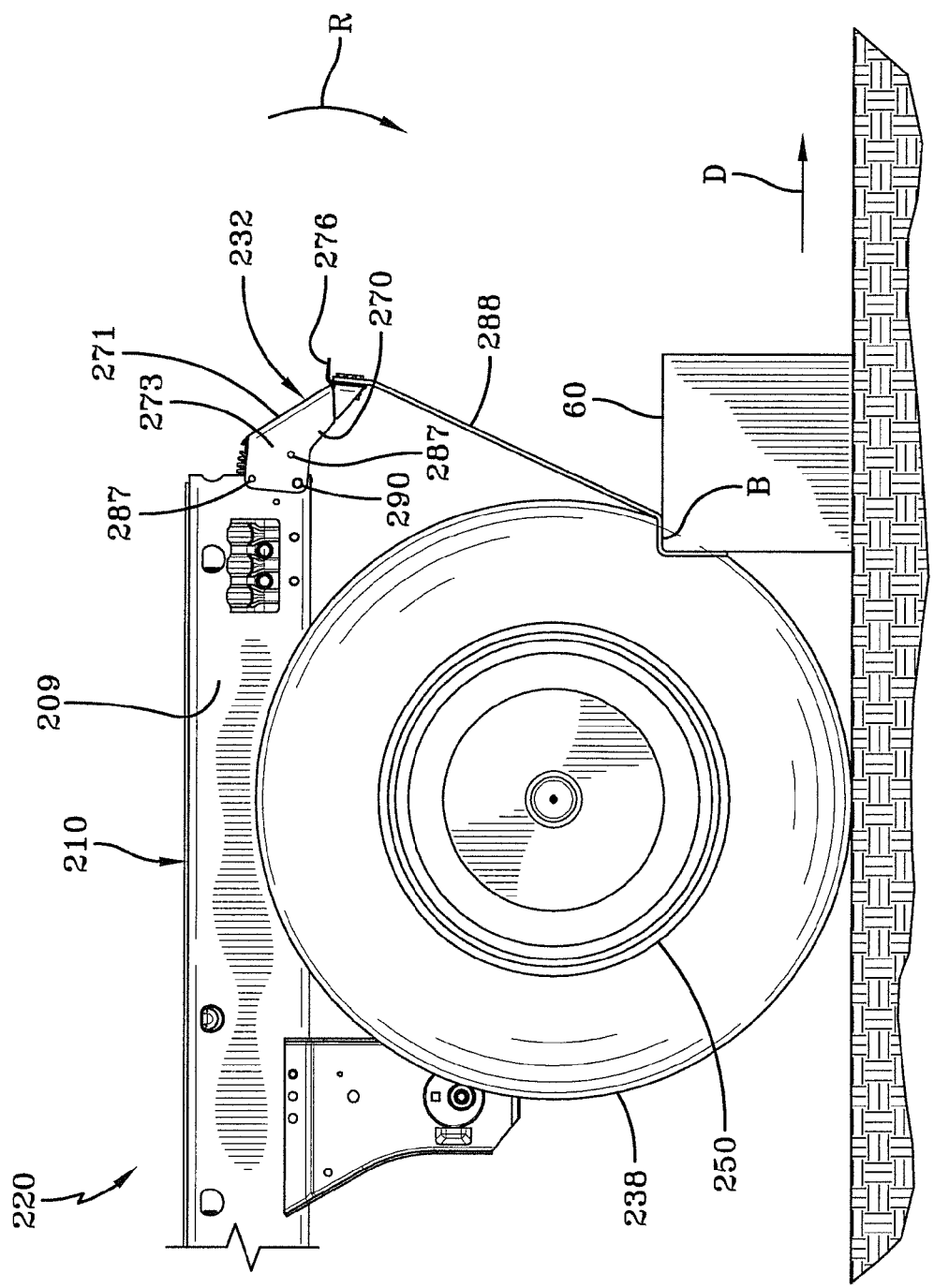
FIG. 16 is a view similar to FIG. 14, showing the mud flap pinched between the rear driver-side tire of the slider box and the curb when the tire contacts the curb, and showing the mud flap angle bracket pivoted downwardly to a position remaining generally parallel to the ground.
Figure 17:
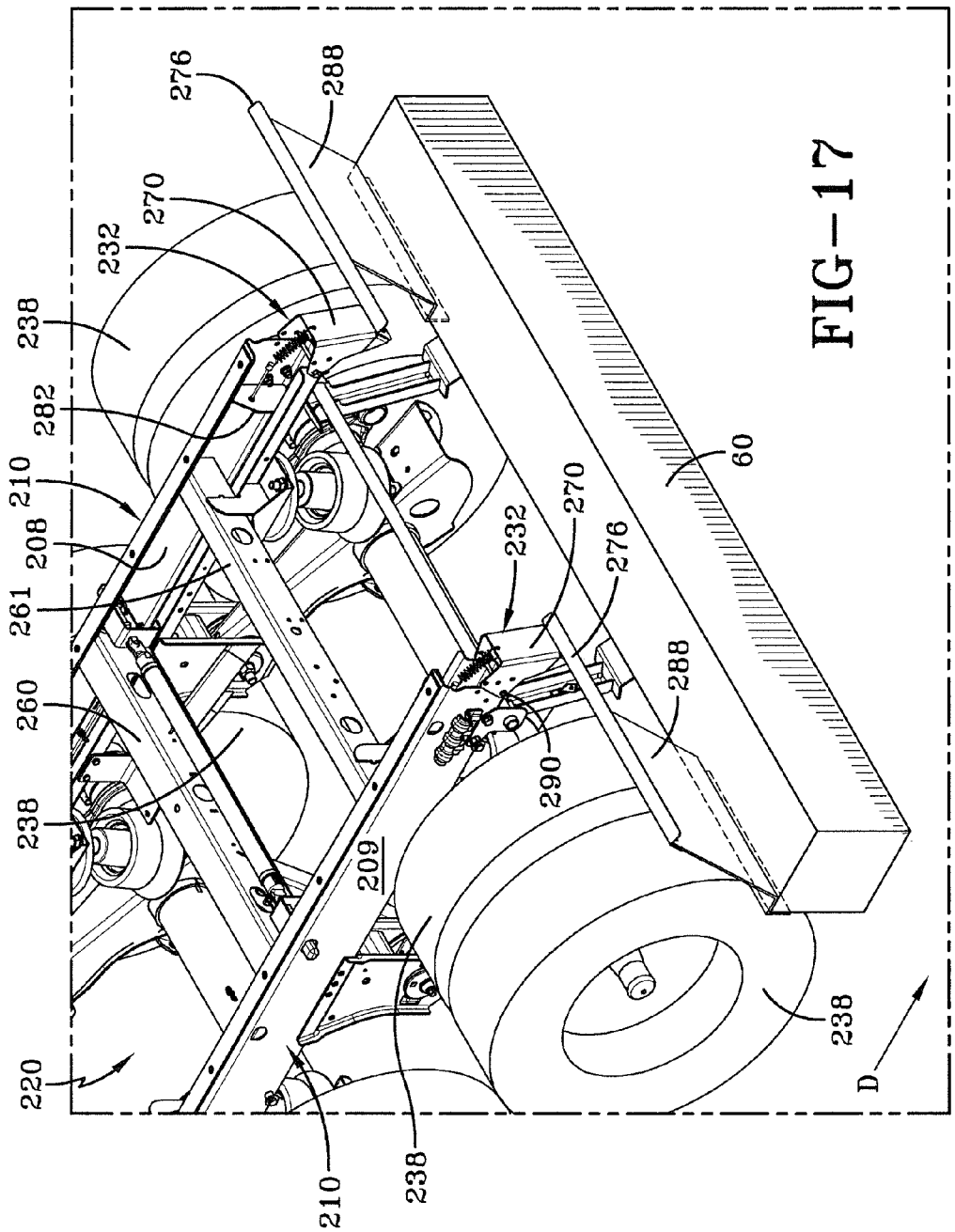
FIG. 17 is a fragmentary rear perspective view similar to FIGS. 12 and 16, showing the driver-side and curb-side mud flap assemblies pivoted downwardly as the mud flaps are pinched between the rearmost tires of the slider box and the curb.
Figure 18:
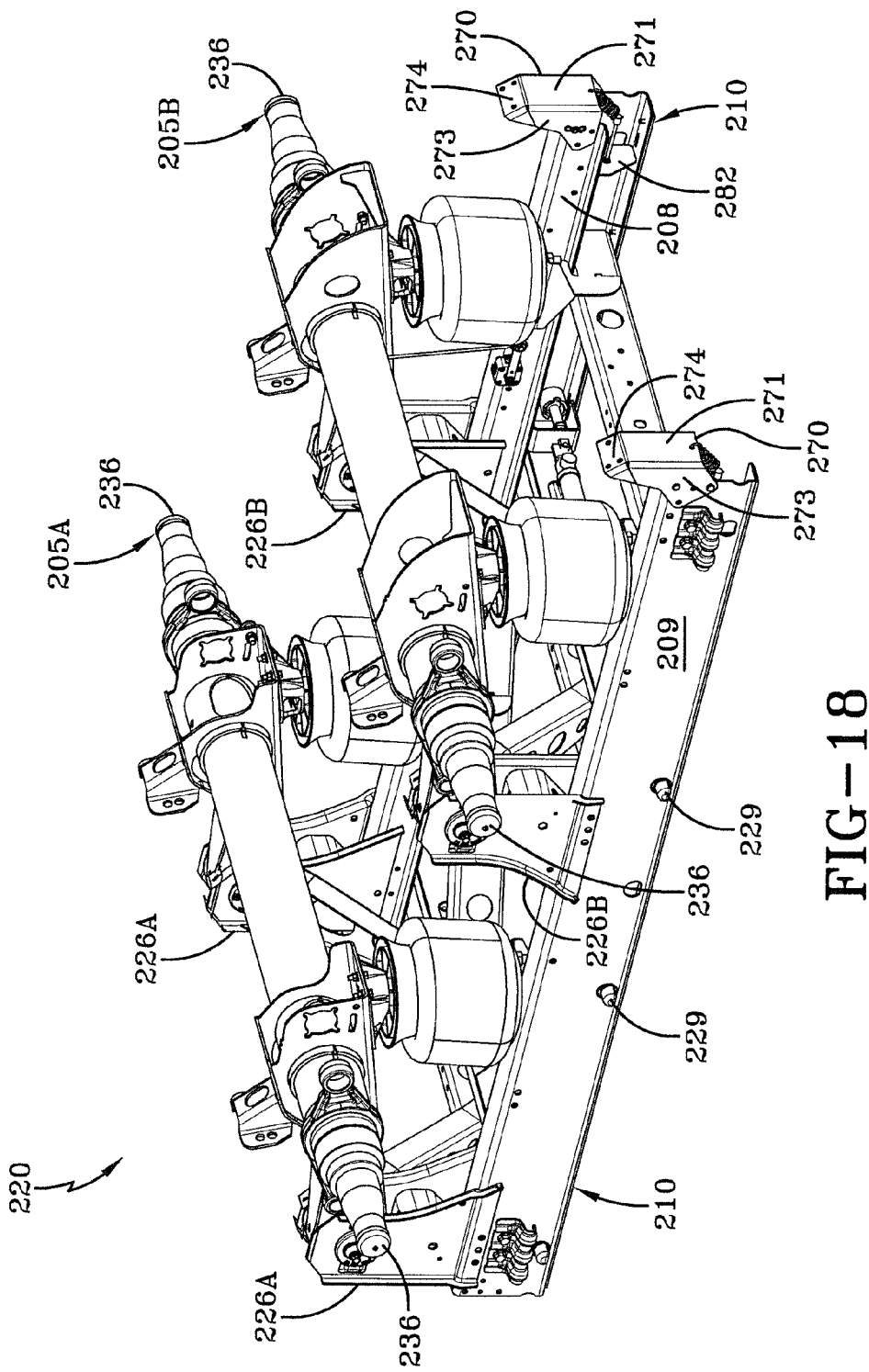
FIG. 18 is an inverted perspective view of the slider box shown in FIG. 12 with the tires, mud flaps and mud flap angle brackets removed, and showing the mud flap brackets in the shipping position prior to assembly of the slider box onto the semi-trailer.

Turning now to FIGS. 14-17, driver-side mud flap assembly 232 is shown mounted on slider 220 of a semi-trailer as described in detail above, and is shown moving with the semi-trailer in a direction D towards a fixed curb 60. Because the driver-side and curb-side mud flap assemblies are generally identical in their operation, only the operation of the driver-side mud flap assembly will be described below, with the understanding that the operation of the curb-side mud flap assembly will be substantially identical thereto. With particular reference to FIG. 14, preferred embodiment mud flap assembly 232 is shown in its normal operating position as it nears fixed curb 60 moving in direction D with the semi-trailer as the vehicle backs up towards the curb. Turning now to FIG. 15, as the semi-trailer moves further in direction D toward curb 60, mud flap 288 of mud flap assembly 232 contacts the curb at point A and is moved toward tire 238. Turning now to FIGS. 16 and 17, as the semi-trailer moves further in direction D toward curb 60, mud flap 50 becomes pinched between tire 238 and the curb at point B. As a result thereof, mud flap 288 is pulled downwardly toward curb 60 and mud flap bracket 270 and angle bracket 276 are rotated downwardly in direction R as they pivot around dowel pin 290. Mud flap 288, mud flap bracket 270 and angle bracket 276 are moved or deflected downwardly so that the mud flap, the mud flap bracket and the angle bracket exhibit substantially uniform downward movement in the direction of curb 60 and the ground on which the curb is sitting. Because mud flap bracket 270 and angle bracket 276 rotate downwardly in direction R, the structural integrity of mud flap assembly 232 is maintained and the mud flap assembly is not damaged. Moreover, because driver-side mud flap assembly and curb-side mud flap assembly 232 are not joined to one another, they can operate independently of one another, thus allowing for greater operational flexibility. Having now described the operation of first preferred embodiment mud flap assembly 232 of the present invention, the shipping configuration and assembly of mud flap bracket 270 will be described in detail below in FIGS. 18-25.

Turning now to FIGS. 18-25, mud flap bracket 270 of mud flap assembly 232 is shown mounted on slider 220 in a shipping configuration with the wheels and the tires removed. With particular reference to FIG. 19, dowel pin 290 is disposed through shipping opening 287 and through aligned openings (not shown) formed in inboard sidewall 208 and outboard sidewall 209 of slider box main members 210. Stop fastener 289 is disposed through second shipping opening 287A and an aligned opening formed in outboard sidewall 209 of slider box main member 210. Stop fastener 289 is finger tightened and holds mud flap bracket 270 in place during shipping of slider box 220. In this configuration, tensioning bolt 281 is backed off and spring 284 is relaxed. Turning now to FIGS. 20-25, the stepwise assembly of mud flap bracket 270 from the shipping configuration to the operating configuration is shown and will now be described in detail below.

Figure 20:
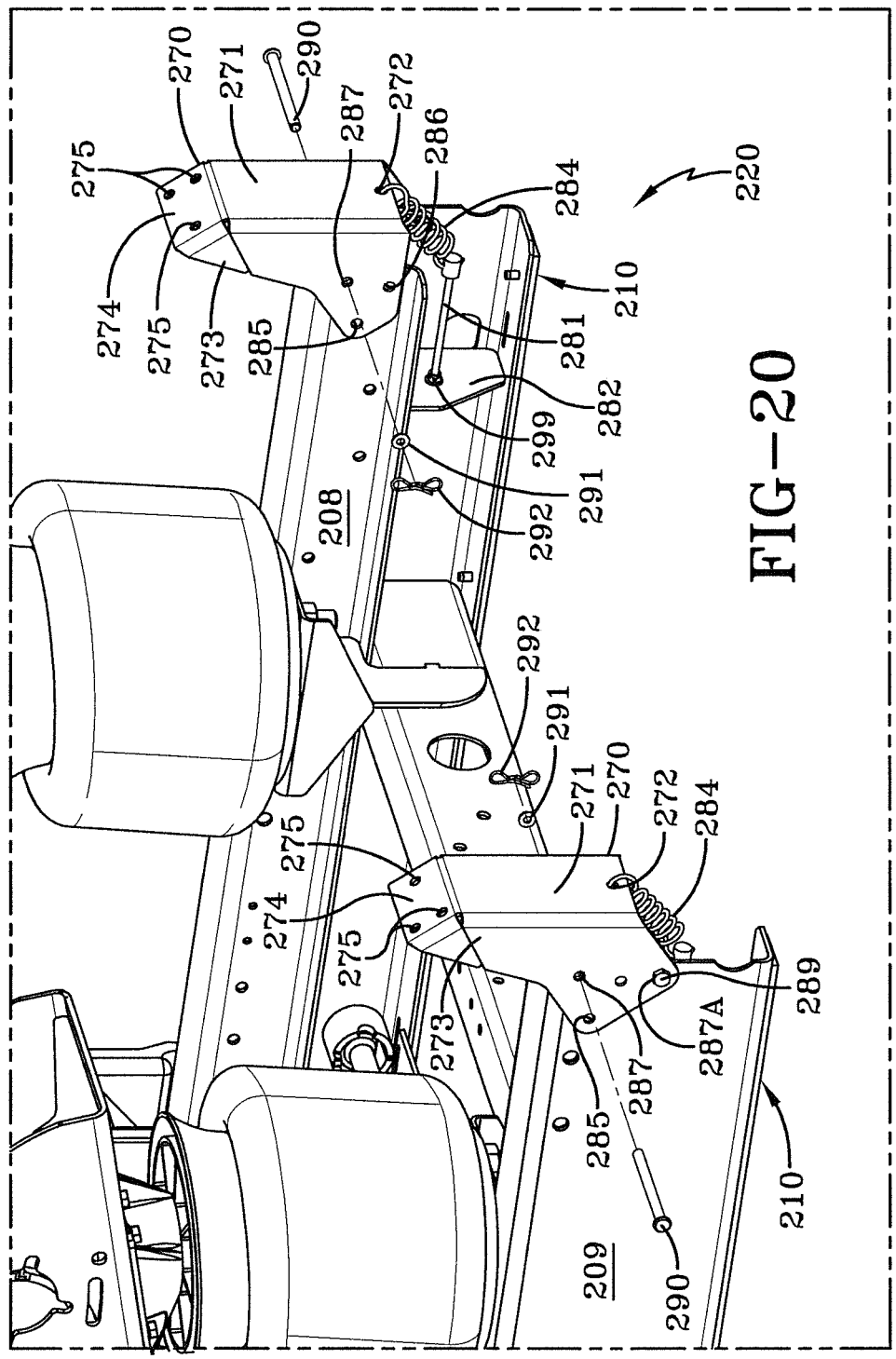
FIG. 20 is a view similar to FIG. 19, showing the dowel pin, washer and bowtie retaining clip of the mud flap bracket in exploded view.
Figure 21:
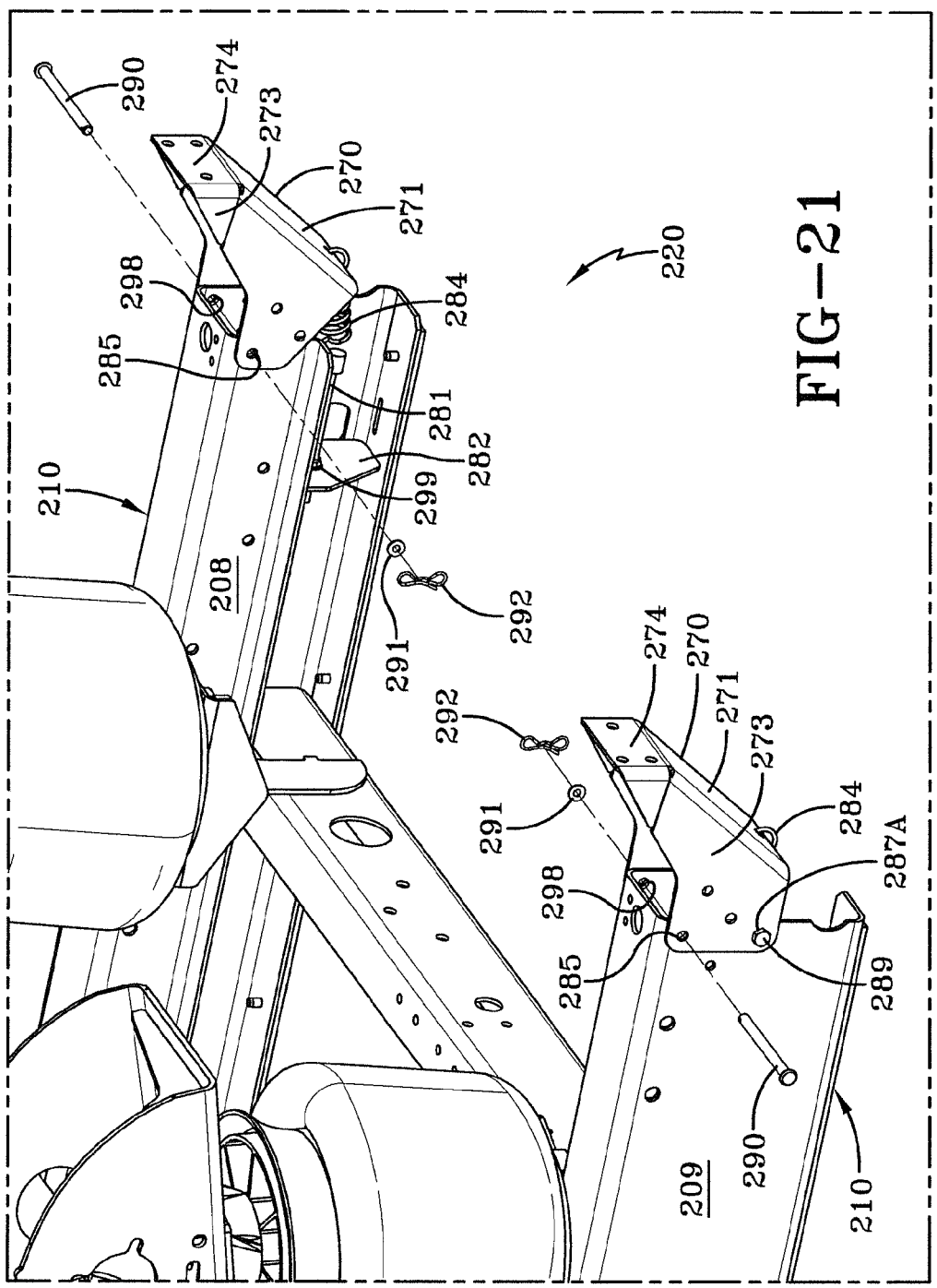
FIG. 21 is a view similar to FIG. 20, showing the dowel pins, washers and bowtie retaining clips repositioned into the operating position prior to installation of the slider box onto the semi-trailer.
Figure 22:
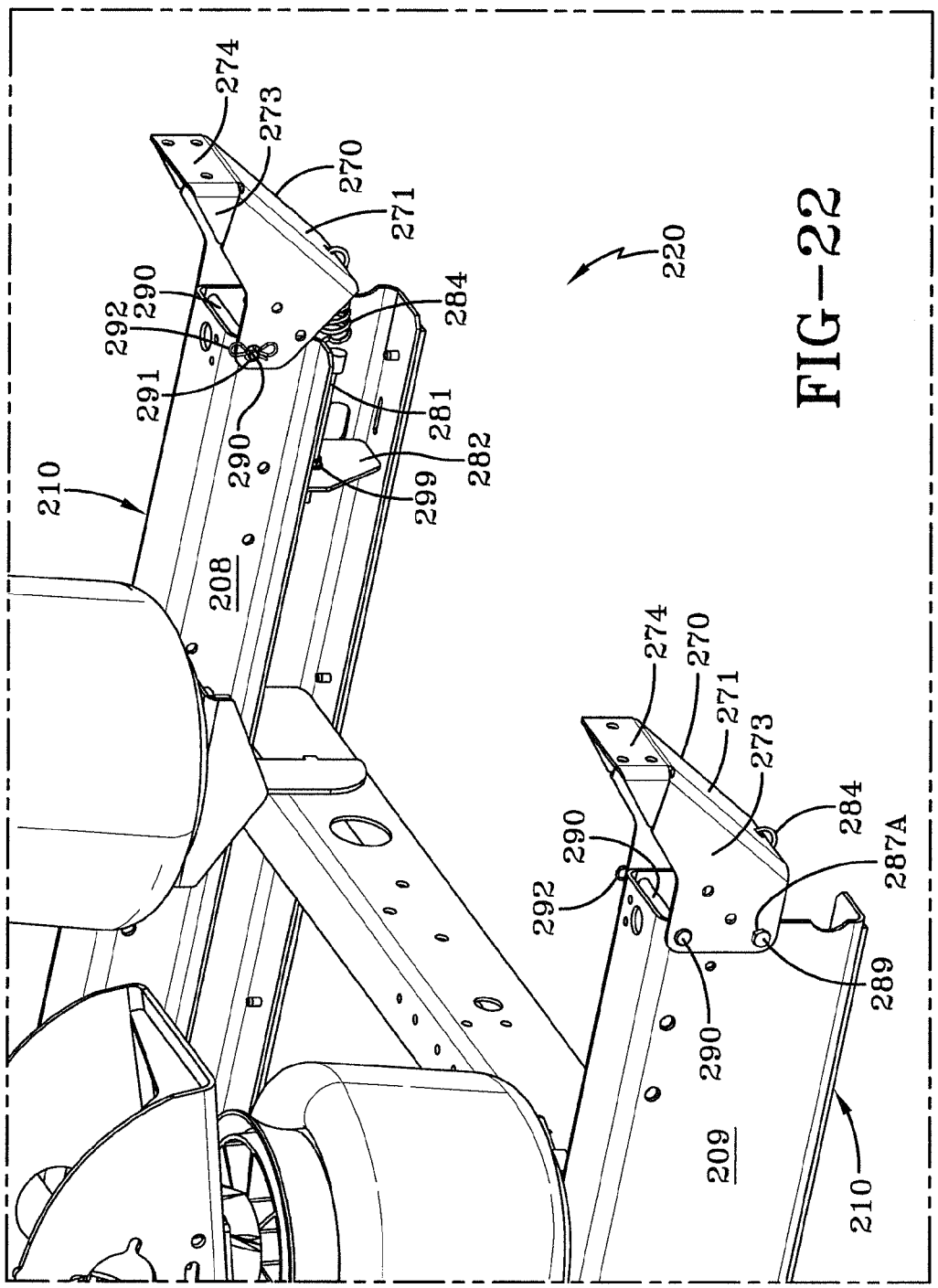
FIG. 22 is a view similar to FIG. 21, showing the final operating position of the dowel pins, washers and bowtie retaining clips.
Figure 23:
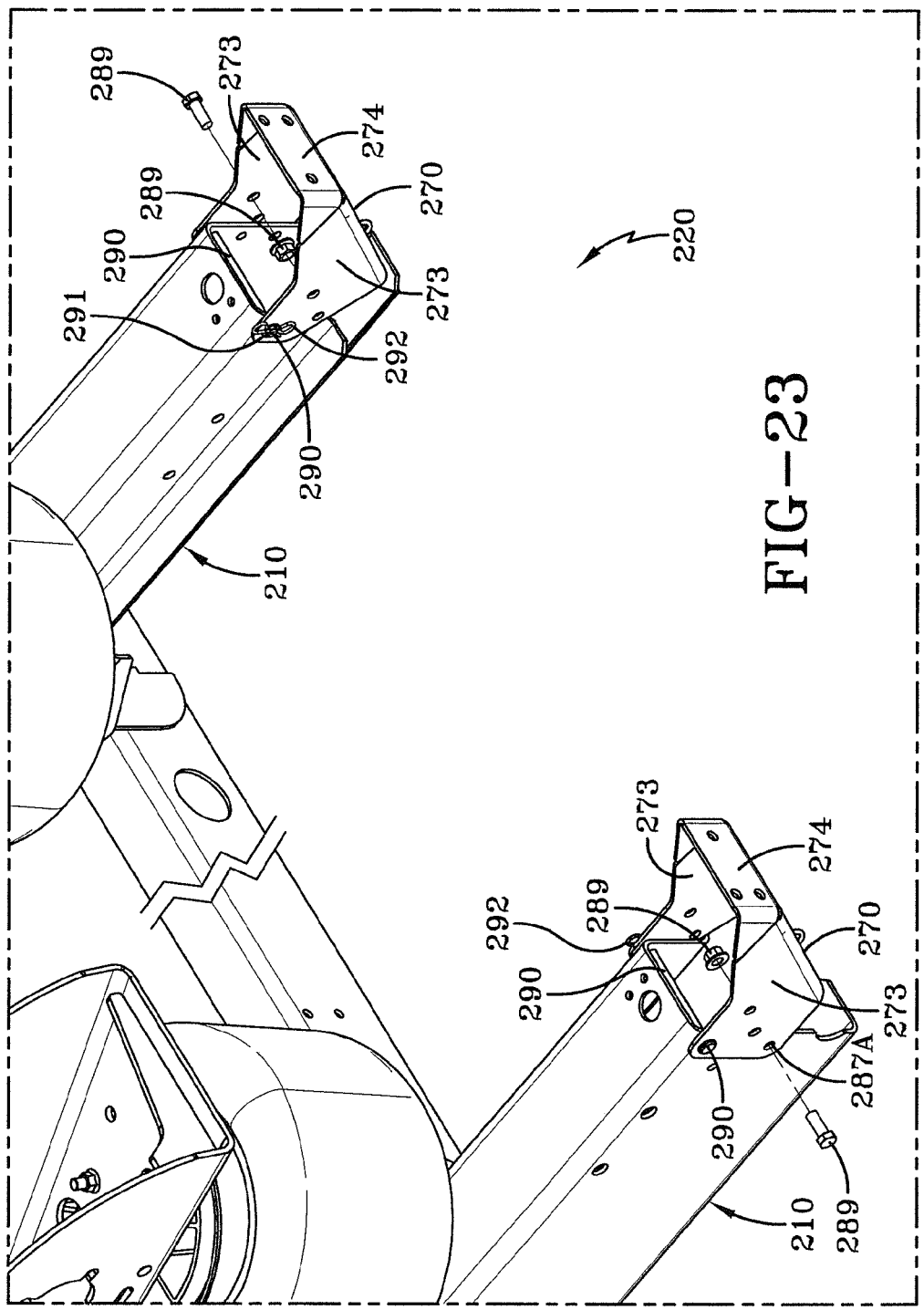
FIG. 23 is a view similar to FIG. 22, showing insertion of the stop fastener during assembly of the mud flap bracket onto the slider box.
Figure 24:
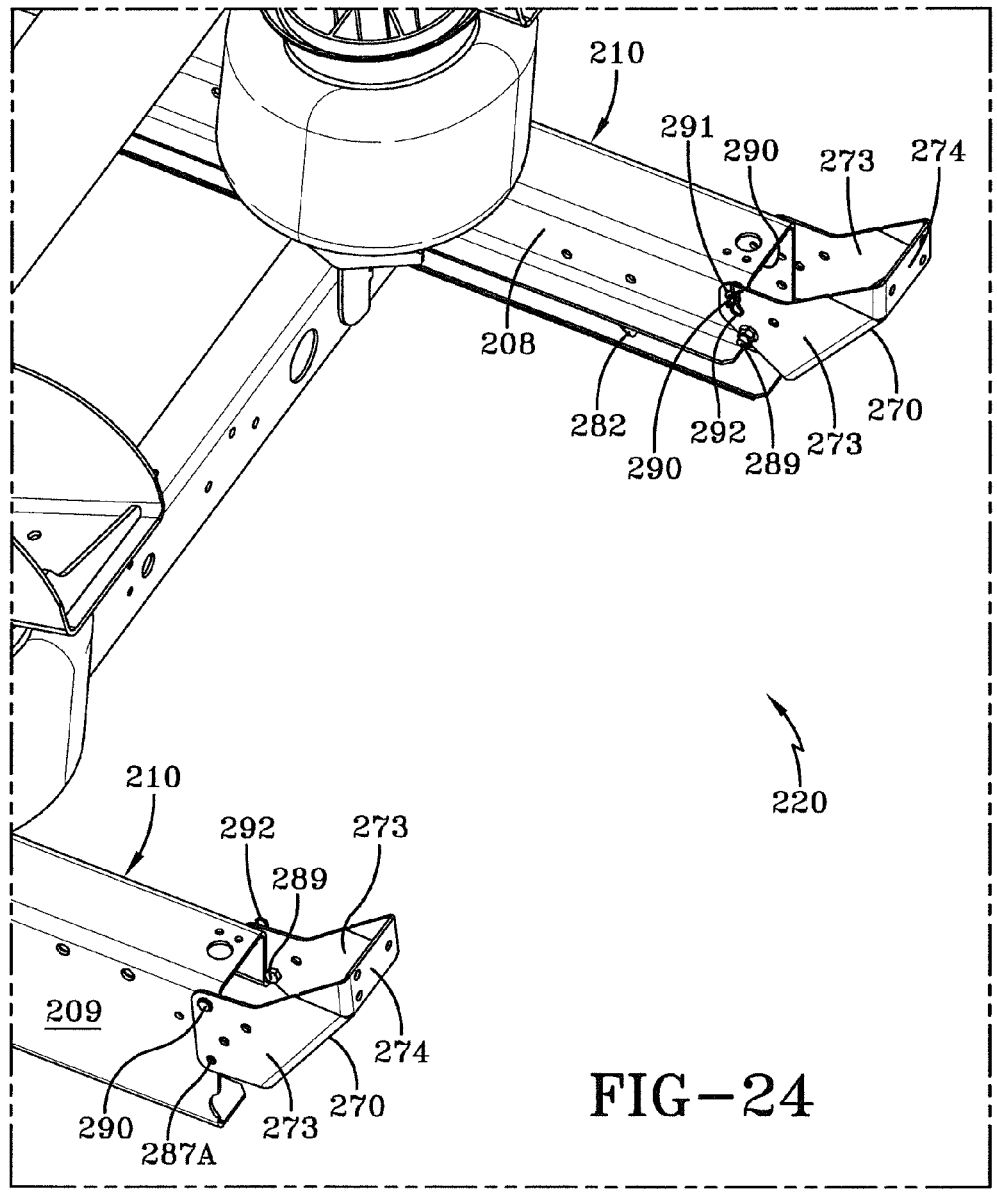
FIG. 24 is a view similar to FIG. 23, showing the final operating position of the stop fastener.
Figure 25:
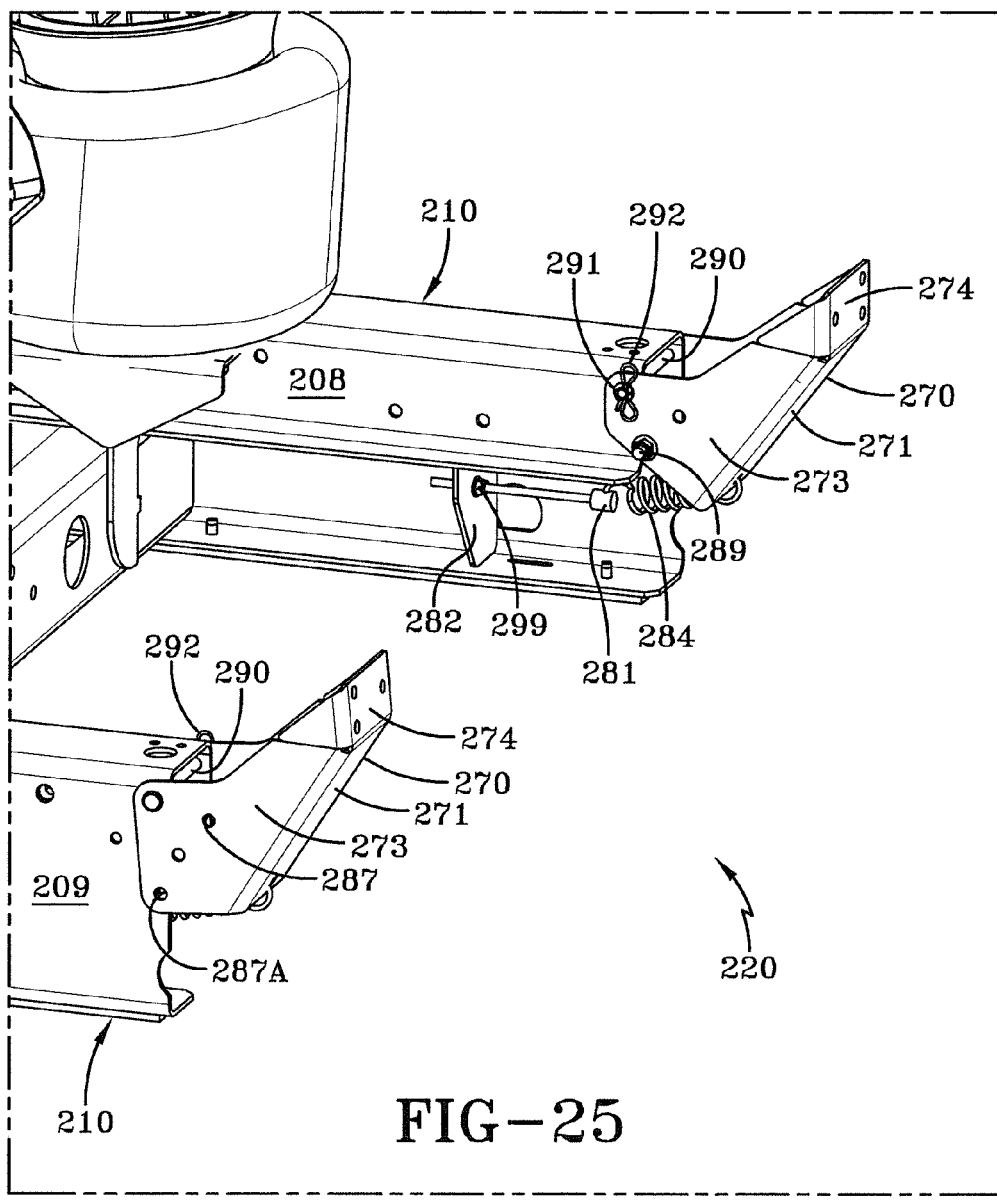
FIG. 25 is a view similar to FIG. 24, showing the mud flap bracket fully assembled and attached to the spring and tensioning bolt.

Referring now to FIG. 20, bowtie retainer clip 292 and washer 291 are removed from dowel pin 290 and the dowel pin is removed from shipping opening 287. As shown in FIG. 21, mud flap bracket 270 is rotated so that angle plate 274 is generally perpendicular to the ground. Dowel pin 290 is inserted through pivot openings 285 and aligned openings 298 formed in the inboard and outboard walls of main member 210 of slider box 220. Washer 291 is disposed on the inboard end of dowel pin 290 and bowtie retainer clip is disposed through the opening (not shown) formed in the inboard end of the dowel pin as shown in FIG. 22. Turning now to FIG. 23, stop fastener 289 is removed from shipping opening 287A formed on the outboard sidewall 273 of mud flap bracket 270. Turning now to FIG. 24, stop fastener 289 is inserted in stop opening 286 on the inboard sidewall 273 of mud flap bracket 270. Stop fastener 289 contacts the inboard sidewall of main member 210 of slider box 220 to prohibit the mud flap bracket from pivoting upwardly so that angle plate 274 is maintained essentially perpendicular to the ground. Turning now to FIG. 25, tensioning bolt 281 is shown adjusted to operating position, automatically setting the proper tension and bias for spring 284. Angle brackets 276 and mud flaps 288 are installed and mud flap assembly is fully assembled as shown in FIG. 12.

First preferred embodiment mud flap assembly 232 of the present invention overcomes the problems associated with prior art mud flap mounting brackets 32,132 by providing mud flap mounting assembly 232 for slider box 220 of a semi-trailer that is relatively lightweight, easy to assemble, and that provides rotation and generally parallel deflection of mud flap angle bracket 276 with respect to the ground, thereby eliminating deformation and damage to the mud flap assembly and tearing away of mud flap 288 from mounting bracket 270 when the mud flap is pinched between tires 238 and curb 60 or other fixed object.

Turning to FIGS. 26-29, a second preferred embodiment mud flap assembly of the present invention is indicated at 332, mounted on slider box 220 for a semi-trailer. As described above and shown in FIG. 12, slider box 220 includes pair of main members 210, front generally K-shaped cross member 230, rear cross member 260, rear cross brace 261 and front and rear pairs of hangers 226A and 226B, respectively. Cross member 230 includes base member 221 and pair of angled cross brace members 222. Base member 221 is connected at each one of its ends to a respective one of main members 210. Each one of cross brace members 222 is connected at its inboard end to the central portion of the rear surface of base member 221 and at its outboard end to a respective one of inboard surfaces of main members 210. Main members 210 each have a generally G-shaped transverse cross-section. Front and rear pairs of hangers 226A and 226B, respectively, depend from the lowermost surface of respective ones of main members 210. Hangers 226A,B are longitudinally spaced from one another and pivotally mount front and rear axle/suspension systems 205A, 205B. Retractable pin mechanism 229 used for selectively locking slider box 220 in place beneath a primary frame (not shown) of a vehicle also is shown, but does not form part of the slider box. Wheels 250 are rotatably mounted on axle spindles 236 of axle/suspension systems 205A,B in a manner well known to those skilled in the art. Tires 238 are mounted on each of wheels 250 in a manner well known to those having skill in the art.

Figure 26:
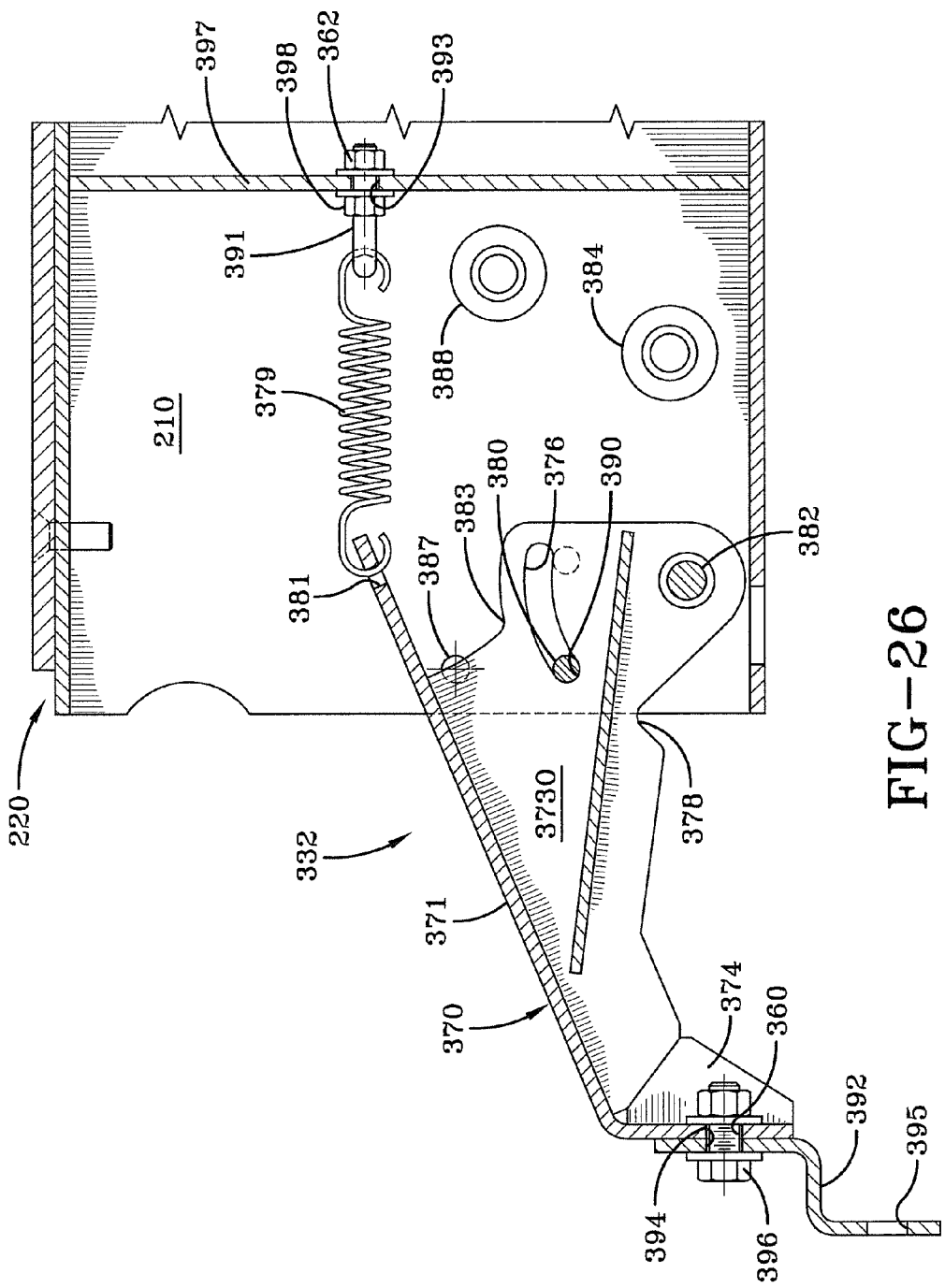
FIG. 26 is a fragmentary side view, looking in the outboard direction, of a driver-side second preferred embodiment mud flap assembly of the present invention with portions in section, showing the mud flap assembly in its normal operating state with the mud flap removed.

Second preferred embodiment mud flap assembly 332 includes a mud flap bracket 370 formed from a rigid material such as steel and having a generally U-shaped cross-section. More specifically, mud flap bracket 370 is integrally formed as one piece and includes a generally flat top plate 371. An inboard sidewall 373I and an outboard sidewall 373O (FIG. 27) extend downwardly from top plate 371. A generally U-shaped angled rear plate 374 extends generally downwardly from the rear edge of top plate 371 and connects to inboard and outboard sidewalls 373I, 373O, respectively. Like first preferred embodiment mud flap assembly 232, second preferred embodiment mud flap assembly 332 utilizes an angle bracket 392 (FIGS. 26 and 27) having a generally elongated S-shaped cross section. Angle bracket 392 is formed with a plurality of openings 394, two of which align with a pair of angled rear plate openings 360 (FIG. 26). Only one opening shown) formed in rear plate 374. Each one of a pair of fasteners 396 (FIG. 27) is disposed through respective aligned openings 394, 360 to rigidly attach angle bracket 392 to mud flap bracket 370. Angle bracket 392 is formed with a plurality of spaced apart openings 395 (only two shown) formed along the length of the lower portion of the angled bracket. Openings 395 align with openings (not shown) formed in the mud flap (not shown) and a fastener (not shown) is disposed through each of the aligned openings in order to rigidly attach the mud flap to angle bracket 392.

In order to connect mud flap assembly 332 to main member 210, mud flap bracket 370 is pivotally attached to the main member utilizing a pivoting connection 382, such as a bolt or other suitable pivoting connection. A coil spring 379 (FIGS. 26 and 27) connects top plate 371 to main member 210 via an opening 381 formed in the top plate, opposite angled rear plate 374. Spring 379 biases mud flap bracket 370 into a normal operating position, as will be discussed below. An eye hook 391 is disposed through an opening 393 formed in a gusset 397 of main member 210. A first nut 398 is threaded onto eye hook 391 on the rear side of gusset 397 and a second nut 362 is threaded onto the eye hook on the front side of the gusset. First nut 398 and second nut 362 provide a means of adjusting the tension of spring 379 and locking the eye hook in place. Coil spring 379 is in turn disposed through eye hook opening 399.

Figure 28:
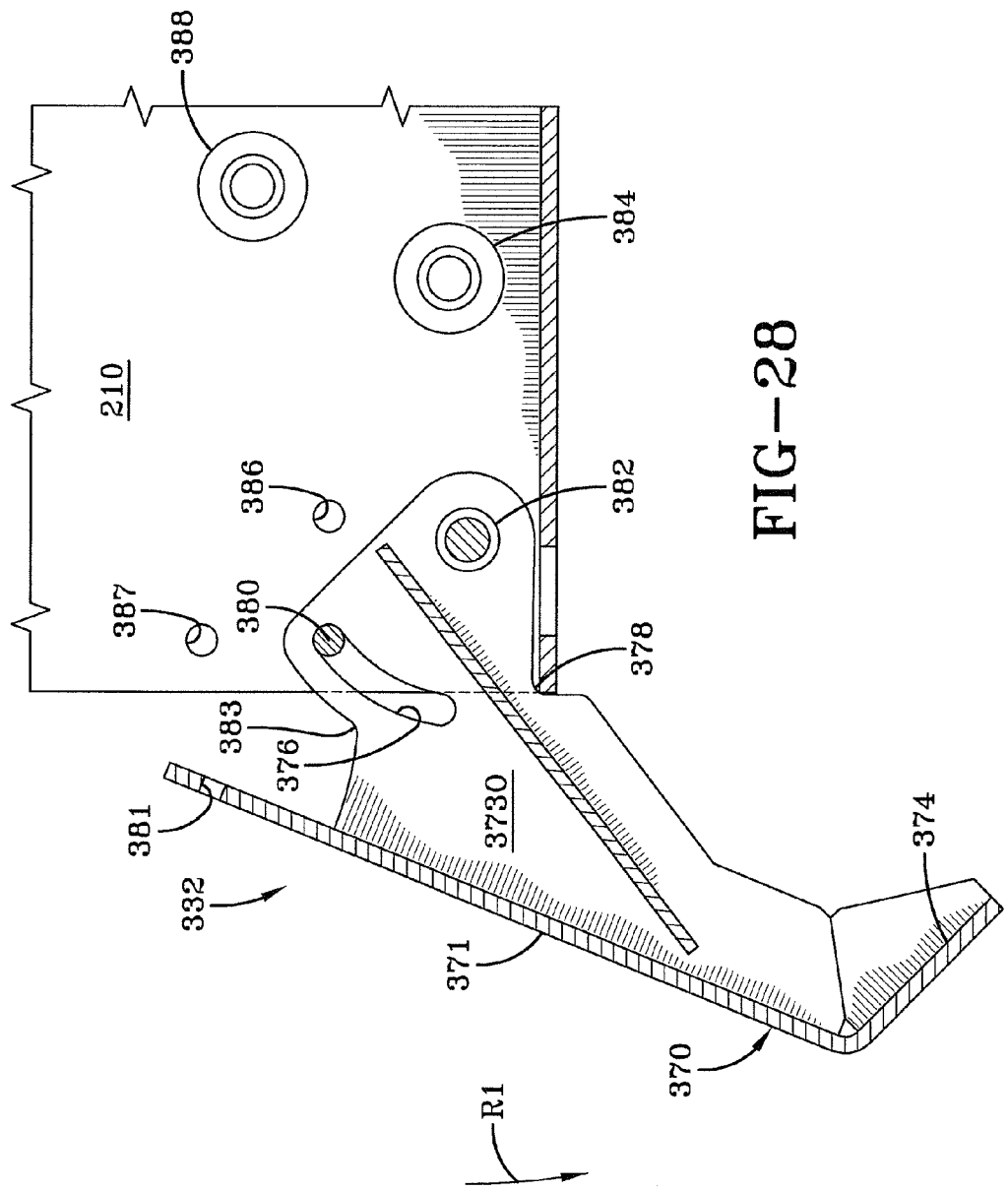
FIG. 28 is a fragmentary side view similar to FIG. 26 with the spring, s-shaped bracket and fasteners removed, showing the second preferred embodiment mud flap assembly pivoted downwardly.

Turning now to an important feature of second embodiment mud flap assembly 332, outboard sidewall 373O of mud flap bracket 370 is formed with means for limiting downward movement of the mud flap bracket to prevent damage to the mud flap bracket. More specifically, aligned elongated arched openings 376 are formed in each one of outboard sidewall 373O and inboard sidewall 373I. A notch 378 is formed in outboard sidewall 373O and inboard sidewall 373I to limit movement of mud flap bracket 370, as will be discussed in more detail below. More particularly, notch 378 is generally formed in the lower portion of each one of outboard sidewall 373O and inboard sidewall 373I. Elongated arched opening 376 is also located generally above and adjacent to notch 378. Top plate 371, outboard sidewall 373O and inboard sidewall 373I are also formed in such a way as to avoid interaction with a pair of bolts 384, 388, which are located on main member 210 adjacent to elongated arched opening 376, during shipping (FIG. 28). More specifically, outboard sidewall 373O and inboard sidewall 373I include a generally elongated L-shape 383 adjacent to elongated arched opening 376. L-shape 383 reduces interference with pair of bolts 384, 388 during shipping (FIG. 28). In this manner, less material may be used thus minimizing cost, and mud flap assembly 332 may be compactly shipped minimizing potential damage to the mud flap assembly.

Figure 27:
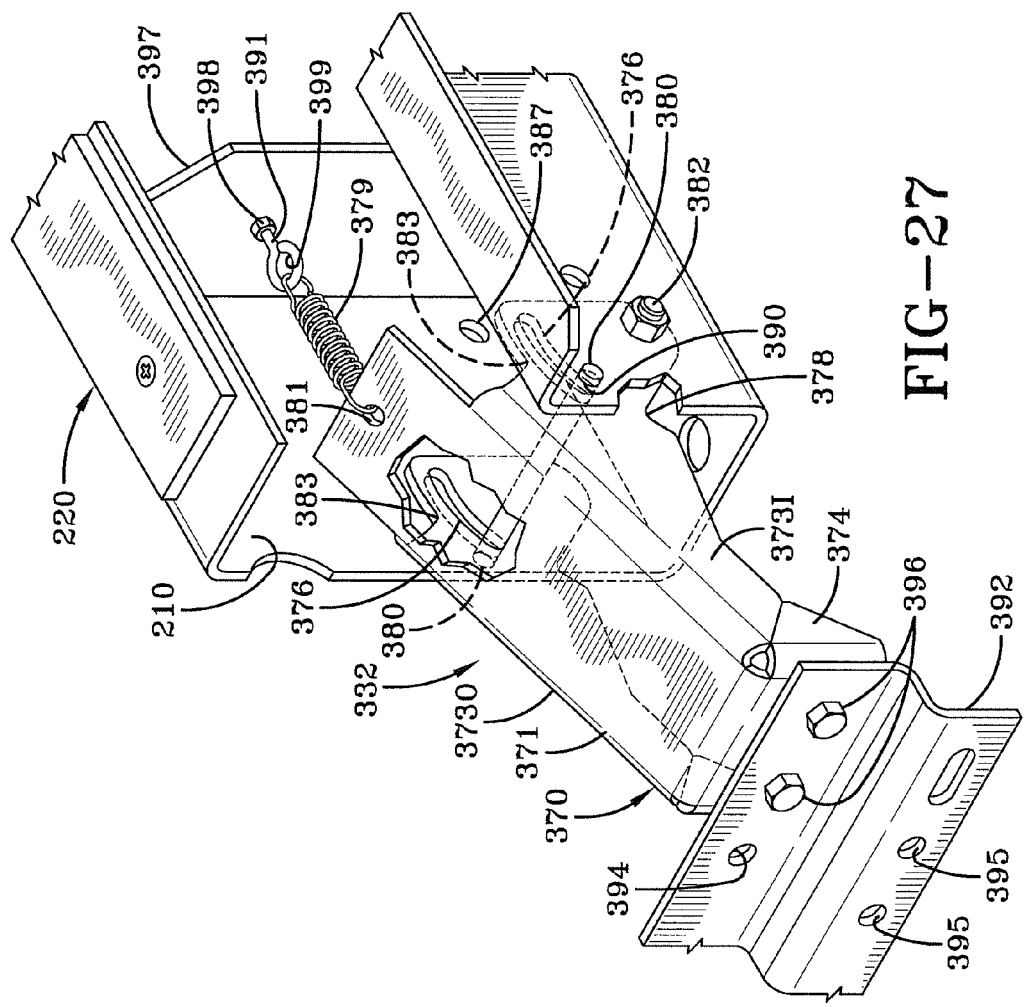
FIG. 27 is a rear fragmentary perspective view of the driver-side second preferred embodiment mud flap assembly shown in FIG. 26, with hidden portions represented by broken lines.

Turning to FIGS. 26-28, the operation of mud flap assembly 332 will now be described. Mud flap assembly 332 of the present invention is shown mounted on main member 210 of a semi-trailer as described above. Because the driver-side and curb-side mud flap assemblies are generally identical in their operation, only the operation of the driver-side mud flap assembly will be described below, with the understanding that the operation of the curb-side mud flap assembly will be substantially identical thereto. With particular reference to FIG. 26, second embodiment mud flap assembly 332 is shown in its normal over-the-road operating position. Turning to FIG. 28, the mud flap (not shown) is pulled downwardly toward a curb (not shown) and mud flap bracket 370 and angle bracket 392 are rotated downwardly in direction R1 as elongated arched opening 376 slides over pin 380 (FIG. 28). More specifically, removable locking pin 380 is immovably mounted in a pair of aligned openings 390 formed in main member 210. In this manner, locking pin 380 and elongated arched openings 376 limit the downward pivotal movement of mud flap assembly 332 to generally about 45 degrees. Additionally, notches 378 limit the downward pivotal movement of mud flap assembly 332 to generally about 45 degrees by the notch contacting main member 210 limiting further movement. Notches 378 share the stopping force of mud flap assembly 332 with locking pin 380 and elongated arched openings 376. Notches 378, pin 380 and elongated arched opening 376 provide means for limiting downward movement of mud flap bracket 370. Other means for limiting downward movement of mud flap bracket 370 are also contemplated such as a positive stop. Spring 379 connected to top plate 371 and main member 210 biases mud flap assembly 332 back to normal operating position after the mud flap is released from being pinched by a curb (not shown) and a tire (not shown).

Figure 29:
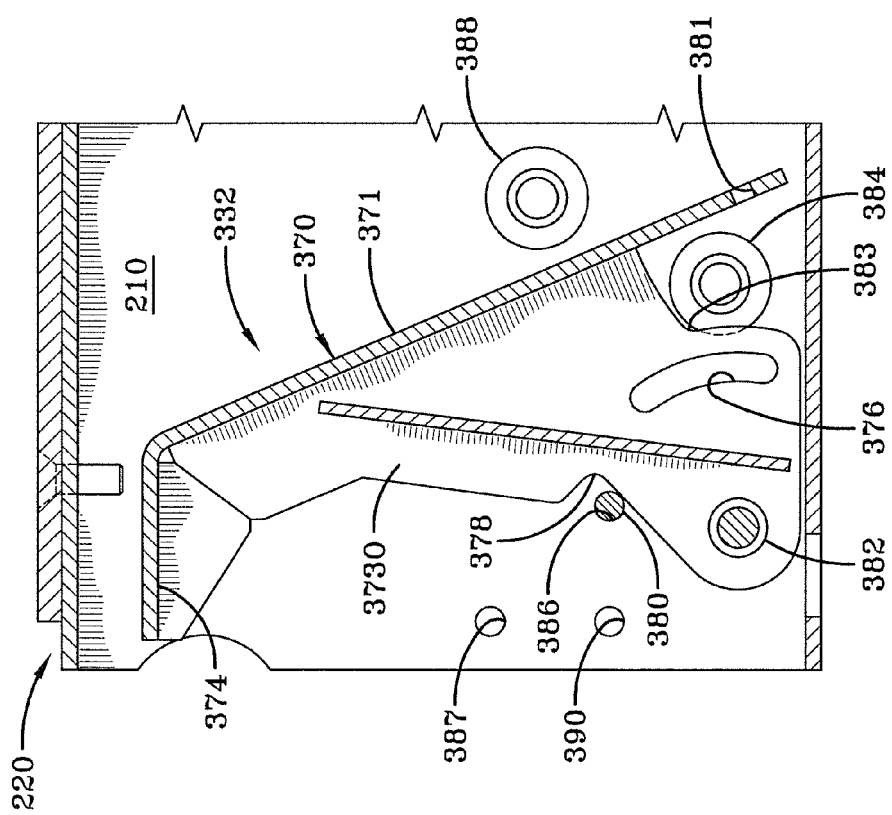
FIG. 29 is a fragmentary side view of the second preferred embodiment mud flap assembly shown in FIG. 26 with portions shown in section and with the spring, s-shaped bracket, fasteners and mud flap removed, showing the mud flap assembly in the shipping position.

Turning to FIG. 29, mud flap bracket 370 of mud flap assembly 332 is shown mounted on main member 210 of slider 220 in a shipping configuration. Locking pin 380 is removably disposed through an opening 386 (FIG. 28) formed in slider box main members 210 adjacent to notch 378 formed in mud flap bracket 370. In this manner, mud flap bracket 370 is secured and movement of the mud flap bracket is limited by pin 380, thus minimizing potential damage to the mud flap bracket during shipping. After shipping, pin 380 is relocated to operation position in opening 390 and the pin is immovably mounted. A second opening 387 is formed in main member 210 which is utilized in shipping. More specifically, second opening 387 receives locking pin 380 during shipping to further secure mud flap assembly 332.

Second preferred embodiment mud flap assembly 332 of the present invention overcomes the problems associated with prior art mud flap mounting brackets 32,132 by providing mud flap mounting assembly 332 for slider box 220 of a semi-trailer that is relatively lightweight, easy to assemble, and that provides rotation and generally parallel deflection of mud flap angle bracket with respect to the ground, thereby eliminating deformation and damage to the mud flap assembly and tearing away of mud flap from mounting bracket when the mud flap is pinched between tires and a curb or other fixed object.

The first and second preferred embodiment mud flap assemblies of the present invention can be utilized in conjunction with all types of wheeled vehicles including those having, without limitation, primary frames, moveable or non-moveable subframes, and including trucks, tractor-trailers, semi-trailers and other heavy-duty and/or non-heavy-duty vehicles. It is contemplated that the first and second preferred embodiment mud flap assemblies of the present invention could be utilized with different styles of main members, such as those having a C-shaped or I-shaped cross-section, without changing the overall concept or operation of the present invention. It is also contemplated that the first and second preferred embodiment mud flap assemblies of the present invention could be utilized with all types of axle/suspension systems, without changing the concept or operation of the present invention. It is further contemplated that the first and second preferred embodiment mud flap assemblies of the present invention could be formed from metals or other rigid materials such as composites, without changing the overall concept or operation of the present invention. It is also contemplated that the first and second preferred embodiment mud flap assemblies of the present invention could be utilized with a single angle bracket 276, 376 that spans both the driver-side and the curb-side tires and that is connected to both driver-side mud flap bracket and curb-side mud flap bracket 270, 370 without changing the overall concept or operation of the present invention. It is further contemplated that other shapes of angle brackets 276, 376 could be utilized on the mud flap assembly of the present invention, such as a C-shape, or other configuration, without changing the overall concept or operation of the present invention. It is contemplated that arched opening 376 could have different lengths and shapes without changing the overall concept or operation of the present invention. It is further contemplated that locking pin 380 could include other removable connections known by those in the art without changing the overall concept or operation of the present invention. It is contemplated that another type of connection could be used other than tensioning bolt 281 or eye hook 391 without changing the overall concept or operation of the present invention. It is even contemplated that sidewalls 373 may be partially located with main member 210 without changing the overall concept or operation of the present invention. It is even further contemplated that notch 378 and L-shape 383 may include other shapes without changing the overall concept or operation of the present invention.

Accordingly, the first and second preferred embodiments mud flap assemblies are simplified, provide an effective, safe, inexpensive and efficient structure and method which achieve all the enumerated objectives, provide for eliminating difficulties encountered with prior mud flap assemblies, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the first and second preferred embodiments mud flap assemblies are used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A mud flap assembly for a vehicle comprising:
   a) a mud flap;
   b) a mud flap bracket attached to said mud flap; and c) means for attaching said mud flap bracket to said vehicle in a transversely cantilevered configuration so that when the mud flap is pinched between a tire of said vehicle and a fixed object, the mud flap bracket and said mud flap are moved substantially uniformly downwardly toward said fixed object.

2. The mud flap assembly for a vehicle of claim 1, wherein said means for attaching said mud flap bracket to said vehicle is a pivotal attachment.

3. The mud flap assembly for a vehicle of claim 2, further comprising a spring attached to said mud flap bracket and to said vehicle, said spring biasing said mud flap bracket and said mud flap into a standard operating position.

4. The mud flap assembly for a vehicle of claim 3, further comprising a tensioning bolt, said tensioning bolt attached to said vehicle and to said spring, said tensioning bolt capable of adjusting a tension on said spring.

5. The mud flap assembly for a vehicle of claim 2, further comprising a stop attached to said mud flap bracket, said stop preventing said mud flap bracket and said mud flap from pivoting upwardly beyond a selected point.

6. The mud flap assembly for a vehicle of claim 2, said stop comprising a fastener disposed through an opening formed in said mud flap bracket.

7. The mud flap assembly for a vehicle of claim 2, further comprising means for limiting downward movement of said mud flap bracket.

8. The mud flap assembly for a vehicle of claim 7, further comprising said mud flap bracket formed with an arched opening.

9. The mud flap assembly for a vehicle of claim 8, further comprising said mud flap bracket formed with a notch.

10. The mud flap assembly for a vehicle of claim 7, further comprising said mud flap bracket formed with an L-shaped cutout to prevent interference during shipping.

11. The mud flap assembly for a vehicle of claim 1, said pivotal attachment means comprising a dowel pin disposed through a pair of aligned openings formed in said mud flap bracket and a pair of aligned openings formed in said vehicle.

12. The mud flap assembly for a vehicle of claim I, wherein said mud flap bracket further comprises an angle bracket attached to said mud flap bracket, said angle bracket attached to said mud flap.

13. The mud flap assembly for a vehicle of claim 12, said angle bracket having a generally L-shaped cross sectional shape.

14. The mud flap assembly for a vehicle of claim 1, said mud flap bracket having a generally U-shaped cross sectional shape.

* * * * *

UNITED STATES PATENT AND TRADEMARK OFFICE
CERTIFICATE OF CORRECTION

| | |
|---|---|
| PATENT NO. | : 9,108,683 B2 |
| APPLICATION NO. | : 14/280765 |
| DATED | : August 18, 2015 |
| INVENTOR(S) | : Ramsey |

It is certified that error appears in the above-identified patent and that said Letters Patent is hereby corrected as shown below:

In the claims,

Amend Claim 6, Column 13, line 22, after the word "claim" delete the number "2" and replace with the number "5".

Amend Claim 12, Column 14, line 16, after the word "claim" delete the letter "l" and replace with number "1".

Signed and Sealed this
Twelfth Day of January, 2016

Michelle K. Lee
*Director of the United States Patent and Trademark Office*